United States Patent [19]
Magistro et al.

[11] Patent Number: 5,178,938
[45] Date of Patent: Jan. 12, 1993

[54] COMPOSITION FOR ADHESION OF POLYURETHANE-COATED NYLON FABRICS

[75] Inventors: Angelo J. Magistro, Brecksville; Phillip S. Neal, Vermillion, both of Ohio

[73] Assignee: The B. F. Goodrich Company, Brecksville, Ohio

[21] Appl. No.: 680,225

[22] Filed: Apr. 4, 1991

Related U.S. Application Data

[63] Continuation-in-part of Ser. No. 576,578, Aug. 31, 1990, abandoned, which is a continuation of Ser. No. 412,074, Sep. 25, 1989, abandoned, and a continuation-in-part of Ser. No. 756,536, Aug. 31, 1990, abandoned, which is a continuation of Ser. No. 503,334, Mar. 30, 1990, abandoned, which is a continuation-in-part of Ser. No. 412,074.

[51] Int. Cl.$^5$ .............................................. B32B 7/00
[52] U.S. Cl. ...................................... 428/252; 428/246; 428/287; 428/423.5; 428/475.5
[58] Field of Search .................. 428/246, 252, 423.5, 428/287, 475.5

[56] References Cited

U.S. PATENT DOCUMENTS 4,889,903 12/1989 Baghdachi ............................ 528/17

FOREIGN PATENT DOCUMENTS 71486 10/1977 Romania .
834071 5/1981 U.S.S.R. .

*Primary Examiner*—James J. Bell
*Attorney, Agent, or Firm*—Hudak & Shunk Co.

[57] ABSTRACT

Aromatic mono-, di-, or trihydroxy compounds are used alone or containing peel strength-improving additives, in association with a polyurethane adhesive, for adhering a polyurethane-coated nylon fabric to another polyurethane-coated nylon fabric to form a polyurethane-coated nylon composite, and for adhering a nylon fabric coated with an aluminum flake-containing polyurethane to a polyurethane-coated nylon fabric. Additionally, aromatic mono-, di-, or trihydroxy compounds are utilized in association with a polyurethane adhesive for forming a lamina composition comprising a polyurethane film adhered to a nylon fabric.

55 Claims, 6 Drawing Sheets

COMPOSITION FOR ADHESION OF POLYURETHANE-COATED NYLON FABRICS

CROSS REFERENCES

This application is a continuation-in-part of U.S. Ser. No. 07/576,578 filed Aug. 31, 1990 abandoned, which in turn is a continuation-in-part of U.S. Ser. No. 07/412,074 filed Sep. 25, 1989 now abandoned, both for "Adhesion of Polyurethane Coated Nylon Fabric by a Polyurethane Resorcinol Adhesive"; and further is a continuation-in-part of U.S. Ser. No. 07/576,536, filed Aug. 31, 1990 abandoned, which is a continuation of U.S. Ser. No. 07/503,334 filed Mar. 30, 1990 abandoned, both for "Lamination Of A Preformed Polyurethane Film To A Nylon Fabric By A Polyurethane Resorcinol Adhesive," which in turn is a continuation-in-part of U.S. Ser. No. 07/412,074 filed Sep. 25, 1989 abandoned.

FIELD OF THE INVENTION

The invention relates to the utilization of aromatic mono-, di-, or trihydroxy compounds alone or containing peel strength improving additives, in association with a polyurethane adhesive, for adhering a polyurethane-coated nylon fabric to another polyurethane-coated nylon fabric to form a polyurethane-coated nylon composite, and for adhering a nylon fabric coated with an aluminum flake-containing polyurethane to a polyurethane coated nylon fabric. The invention further relates to a lamina composition comprising a polyurethane film adhered to a nylon fabric utilizing such aromatic mono-, di-, or trihydroxy compounds in association with a polyurethane adhesive.

BACKGROUND

The use of aromatic hydroxy compounds for improved adhesion between nylon materials is known, but the use of aromatic hydroxy compounds alone or containing peel strength-improving additives, to improve adhesion between polyurethane coated nylon fabrics or between polyurethane and nylon, is not known. Heretofore, various polyamide band membranes have been bonded. For example, Romanian Patent 71486 of Oct. 21, 1977, discloses adhesives containing 20 to 60 percent di- or trihydric phenols, 0.1 to 10 percent coumarone-indene resin or phenol formaldehyde resin. Polyamide bands were bonded with a composition containing resorcinol, 30 percent coumarone-indene resin 5, etc.

In Russian Patent 834,071 of May 30, 1981, disclosed is a method for adhering shoe soles and uppers by treating the soles with a composition containing low molecular weight nylon 6, formic acid, resorcinol, and alcohol. An adhesive-containing low temperature neoprene rubber is prepared by a sulfur control polymerization containing phenol-formaldehyde resin. The adhesive is applied to both soles and uppers, dried, activated by heat treatment, and bonded by hot pressing the two adhesive-coated surfaces together.

SUMMARY OF THE INVENTION

Figure 1:
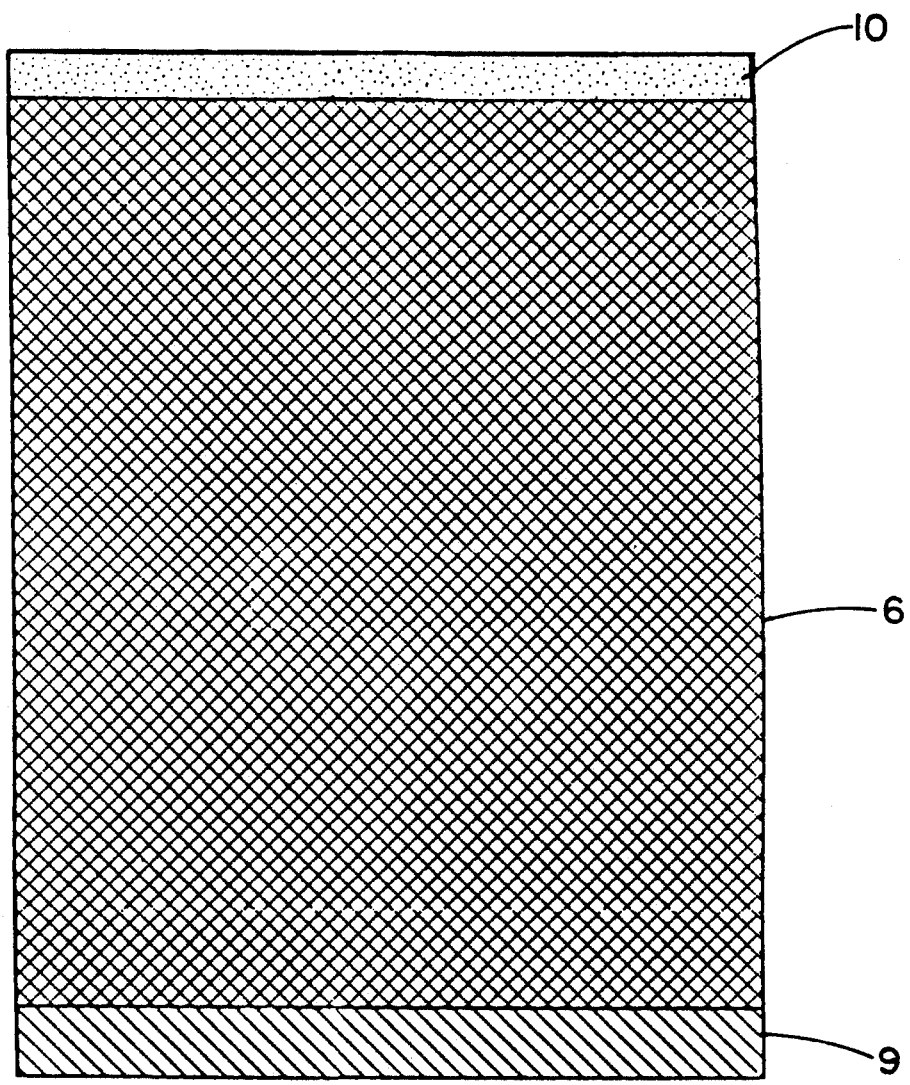
FIG. 1 is a schematic drawing of a polyurethane-coated nylon fabric, and is merely one example of a configuration of such fabric that may be used in the practice of the present invention and which is commonly applied in the construction of aircraft evacuation slides.

The present invention is directed to an AR(OH)$_n$ composition alone or containing peel strength improving additives for improving the bonding properties of an adhesive compound used for bonding a polyurethane coated nylon fabric to another polyurethane coated nylon fabric. The adhesive itself is a polyurethane. A mixture of a hydroxy compound of the formula AR(OH)$_n$ alone or containing the peel strength improving additives may be added to the adhesive to form an adhesive admixture. Alternatively, AR(OH)$_n$ alone or containing the peel strength improving additives may be added to a polar solvent, and this solution is then brushed, sprayed or rolled onto a polyurethane-coated nylon substrate. After evaporation of the polar solvent, the adhesive is applied and the remaining polyurethane coated nylon substrate is bonded thereto. AR represents an aromatic moiety such as a benzene or naphthalene nucleus and n is an integer of from about 1 to about 3. The adhesive is free from formaldehyde. The peel strength improving additive includes a silicone or titanium base or a blend thereof containing either —OH, —SH, —NH$_2$, or phosphorus functional groups, or combinations thereof.

The present invention further is directed to such an AR(OH)$_n$ composition used in association with a polyurethane adhesive for laminating a polyurethane film to a nylon fabric. A precoat of an ethyl alcohol solution containing AR(OH)$_n$ is brushed, sprayed, rolled, or otherwise suitably applied to either the polyurethane film or the nylon fabric. After evaporation of the ethyl alcohol, an adhesive diluted with a ketone is applied over the precoat and to the other surface to be adhered. After evaporation of the ketone, a lamina is formed by adhering the polyrethane film and nylon fabric. If desired, the adhesive layer can also contain AR(OH)$_n$. AR represents an aromatic moiety such as a benzene or naphthalene nucleus and n is an integer of from about 1 to about 3. The adhesive is free from formaldehyde.

DETAILED DESCRIPTION OF THE INVENTION

The first embodiment of the present invention is directed to a composition of AR(OH)$_n$ and a formaldehyde-free polyurethane adhesive used to form adhesive bonds between a nylon fabric coated with polyurethane and another nylon fabric coated with an aluminum flake-containing polyurethane. The adhesive itself is a polyurethane. AR is a benzene or naphthalene nucleus and n is an integer of from about 1 to about 3.

Many types of polyurethane coatings can be utilized in the practice of the present invention, with those formed from polyester and polyether intermediates being preferred. The polyester intermediates generally have a molecular weight range of from about 200 to about 10,500, wherein the molecular weight ranges listed below for the various polyester intermediates are merely desirable and/or preferred ranges, so that any of the various listed polyester intermediates falling within the above broad range could be suitable for use in the formation of the polyurethane coatings.

Polyester intermediate urethane coatings are prepared by reacting a dicarboxylic acid containing from about 2 to about 10 carbon atoms, preferably from about 2 to about 6 carbon atoms, with a glycol containing from about 2 to about 10 carbon atoms, desirably from about 2 to about 6 carbon atoms, and preferably ethylene glycol. The mole ratio of the dicarboxylic acid to the glycol is 1:1.05 to 1.5 which forms a diester. Specific examples of dicarboxylic acids include malonic acid, succinic acid, glutaric acid, adipic acid, pimelic acid, sebacic acid, suberic acid, azelaic acid, maleic acid, and the like. The molecular weight of the polyester intermediate is generally low as from about 500 to about or 1,500. The polyester intermediate is then reacted with a polyisocyanate compound often in the presence of a diol chain extender. The polyisocyanates utilized are generally aromatic diisocyanates such as triphenylmethane-p,p'-diisocyanate, and the like, as well as the various diphenyl diisocyanates such as diphenyl methane diisocyanate, dichlorodiphenyl methane diisocyanate, diphenyl dimethyl methane diisocyanate, para-phenylene diisocyanate, meta-phenylene diisocyanate, naphthalene-1,5-diisocyanate, meta-tolylene diisocyanate, and the like. The mole ratios of the various components to one another are important in order to produce a polyurethane coating substantially free of crosslinks and the like. Examples of such polyester intermediates are set forth in U.S. Pat. Nos. 2,770,612 and 2,871,218 to Schollenberger, which are hereby fully incorporated by reference.

Another type of polyurethane coating is made from phthalic acids which are reacted with saturated glycols containing from about 3 to about 10 carbon atoms to produce a polyester intermediate having a molecular weight of from about 250 to about 2,500. This polyester intermediate is reacted with any type of aromatic diisocyanate known to the art and optionally but preferably with a diol chain extender. Representative examples of aromatic diisocyanates include para-phenylene diisocyanate, 4,4'-dibenzyl diisocyanate, dianisidene diisocyanate, meta-phenylene diisocyanate, tolylene diisocyanate, ditolylene diisocyanate, and the like. Such a polyurethane coating is free from crosslinks and generally contains no free isocyanate groups therein. A more detailed description of such types of polyester polyurethanes is set forth in U.S. Pat. No. 3,015,650 to Schollenberger which is hereby fully incorporated by reference.

Still other types of suitable polyurethane coatings which can be utilized are those obtained by reacting a long chain polyester intermediate having a molecular weight of from about 400 to about 10,000, and preferably from about 800 to about 6,000, with a polyisocyanate, preferably a diisocyanate, and a chain extender having a molecular weight of up to about 400. Preferred chain extenders include short-chain polyols having a molecular weight of up to about 380. The equivalent weight ratio of isocyanate groups to the hydroxyl groups is from about 0.9 to about 1.1 and preferably from about 0.98 to about 1.04. Hence, these types of polyester polyurethanes generally have a higher molecular weight than the above-described type and are also crosslinked or cured. Such elastomer polyurethanes have a Tg of 0° C. or less, and preferably from about minus 10° C. to about minus 55° C. Such polyester polyurethanes are set forth in U.S. Pat. Nos. 4,397,974 and 4,542,170 which are hereby fully incorporated by reference.

Polyether intermediate urethane coatings are prepared by reacting a polyalkyleneoxide polyol intermediate with a polyisocyanate. The alkylene group has from 2 to 8 carbon atoms and preferably from 2 to 4 carbon atoms. Most preferred are the ethylene and propylene groups as well as tetrahydrofuran. The polyethyleneoxide polyol can be a homo- or copolymer. Comonomers include butyleneoxide and pentyleneoxide. The comonomers can either be random or blocked. The polyol intermediate may or may not be a blend of monols, diols, or triols. Generally, the average functionality of the polyethyleneoxide polyol intermediate is from about 1.9 to about 3.0.

Considering the polybutyleneoxide polyol intermediate, it can be a homopolymer or a copolymer. Suitable comonomers which can be utilized include ethyleneoxide, propyleneoxide, or pentyleneoxide. Ethyleneoxide is a preferred comonomer. The average functionality of the polypropyleneoxide polymer intermediate is from about 1.9 to about 3.0.

The polyisocyanates which are reacted with the polyol intermediates and usually chain extenders generally have the formula R(NCO)$_n$ wherein n is 2, 3 or 4 and R is an aliphatic, an aromatic, or an aliphatic substituted aromatic having from 4 to 20 carbon atoms and preferably from 6 to 15 carbon atoms. Desirably the aliphatic groups are alkyl groups. Examples of specific di- or triisocyanates which can be utilized include p,p',p"-triisocyanato triphenyl methane, p,p'-diisocyanato diphenyl methane (MDI), hexamethylene diisocyanate, polymethylene polyphenylisocyanate (PAPI), naphthalene-1,5-diisocyanate, and various isomers of toluene diisocyanates (TDI) such as 2,4-tolylene diisocyanate, 2,6-tolylene diisocyanate, and mixtures thereof. MDI and TDI are preferred. Inasmuch as an adhesive type composition is desired, the equivalent weight ratio of the polyisocyanate to the polyol intermediate and chain extender, that is the NCO/OH ratio is from about 1.8 to about 2.2 and preferably from about 2.0 to about 2.1. The formation of the polymer while occurring at ambient temperature is generally conducted at higher temperatures to reduce the reaction time as from between about 40° C. to about 125° C. with from about 60° C. to about 100° C. being preferred.

Yet another type of polyurethane coating which can be utilized in the present invention is based on a hydroxyl-terminated polycarbonate intermediate. More particularly, the polycarbonate-based polyurethane coating useful in the present invention is prepared by reacting a diisocyanate with a blend of the hydroxyl-terminated polycarbonate intermediate and a chain extender. The hydroxyl-terminated polycarbonate intermediate can be prepared by reacting a glycol with a carbonate. Such polycarbonate intermediates are linear and have terminal hydroxyl groups with essential exclusion of other terminal groups. The essential reactants are glycols and carbonates. Suitable glycols are selected from cycloaliphatic and aliphatic diols containing 4 to 40, and preferably 4 to 12 carbon atoms, and from polyoxyalkylene glycols containing 2 to 20 alkoxy groups per molecule with each alkoxy group containing 2 to 4 carbon atoms. Diols suitable for use in the present invention include aliphatic diols containing 4 to 12 carbon atoms such as butanediol-1,4, pentanediol-1,5, neopentyl glycol, hexanediol-1,6, heptanediol-1,7, octanediol-1,8, 2-ethylhexanediol-1,6,2,2,4-trimethylhexanediol-1,6, decanediol-1,10 hydrogenated dilinoleylglycol, hydrogenated dioleylglycol and cycloaliphatic diols such as cyclohexanediol-1,3, dimethylolcyclohexane-1,4, cyclohexanediol-1,4, dimethylolcyclohexane-1,3, 1,4 -endomethylene-2-hydroxy-5-hydroxymethylcyclohexane, and polyalkylene glycols. The diols used in the reaction may be a single diol or a mixture of diols depending on the properties desired in the finished product.

Suitable carbonates are selected from alkylene carbonates composed of a 5 to 7 membered ring having the following general formula:

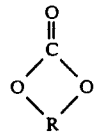

where R is a saturated divalent radical containing 2 to 6 linear carbon atoms. Suitable carbonates for use herein include ethylene carbonate, trimethylene carbonate, tetramethylene carbonate, 1,2-propylene carbonate, 1,2-butylene carbonate, 2,3-butylene carbonate, 1,2-ethylene carbonate, 1,3-pentylene carbonate, 1,4-pentylene carbonate, 2,3-pentylene carbonate, and 2,4-pentylene carbonate.

Also suitable herein are dialkylcarbonates, cycloaliphatic carbonates, and diarylcarbonates. The dialkylcarbonates can contain 2 to 5 carbon atoms in each alkyl group and specific examples thereof are diethylcarbonate and dipropylcarbonate. Cycloaliphatic carbonates, especially dicycloaliphatic carbonates, can contain 4 to 7 carbon atoms in each cyclic structure, and there can be one or two of such structures. When one group is cycloaliphatic, the other can be either alkyl or aryl. On the other hand, if one group is aryl, the other can be alkyl or cycloaliphatic. Preferred examples of diarylcarbonates, which can contain 6 to 20 carbon atoms in each aryl group, are diphenylcarbonate, ditolylcarbonate, and dinaphthylcarbonate.

The reaction is carried out by reacting a glycol with a carbonate, preferably an alkylene carbonate in the molar range of 10:1 to 1:10, but preferably 3:1 to 1:3 at a temperature of 100° to 300° C. and at a pressure in the range of 0.1 to 300 mm of mercury in the presence or absence of an ester interchange catalyst, while removing low boiling glycols by distillation.

More specifically, the hydroxyl-terminated polycarbonate intermediates are prepared in two stages. In the first stage, a glycol is reacted with an alkylene carbonate to form a low molecular weight hydroxy-terminated polycarbonate. The lower boiling point glycol is removed by distillation at 100° to 300°, preferably at 150° to 250° C., under a reduced pressure of 10 to 30 mm Hg, preferably 50 to 200 mm Hg. A fractionating column is used to separate the by-product glycol from the reaction mixture. The by-product glycol is taken off the top of the column and the unreacted alkylene carbonate and glycol reactant are returned to the reaction vessel as reflux. A current of inert gas or an inert solvent can be used to facilitate removal of by-product glycol as it is formed. When the amount of by-product glycol obtained indicates that the degree of polymerization of the hydroxyl-terminated polycarbonate is in the range of 2 to 10, the pressure is gradually reduced to 0.1 to 10 mm Hg and the unreacted glycol and alkylene carbonate are removed. This marks the beginning of the second stage of reaction during which the low molecular weight hydroxyl-terminated polycarbonate is condensed by distilling off glycol as it is formed at 100° to 300° C., preferably 150° to 250° C., and at a pressure of 0.1 to 10 mm Hg until the desired molecular weight of the hydroxyl-terminated polycarbonate is attained. Molecular weight of the hydroxyl-terminated polycarbonates can vary from about 500 to about 10,000 but in a preferred embodiment, it will be in the range of 500 to 2500.

The hyroxyl-terminated polycarbonate intermediates described above are blended with a chain extender before the blend is reacted with a diisocyanate. The amount of chain extender can vary from 0.1 to 10 mols per mol of the polycarbonate, preferably from 0.5 to 5 mols. The chain extender may be any glycol, or combinations of glycols, containing two or more hydroxyl groups and 2 to 10 carbon atoms, such as ethylene glycol, propylene glycol, 1,4-butanediol, 1,3-butanediol, 1,5-pentanediol, 1,6-hexanediol, 1,4-cyclohexanedimethanol, hydroquinone di(hydroxyethyl)ether, or any aliphatic or aromatic molecule containing two or more reactive hydroxyl groups. The preferred chain extender is 1,4-butanediol.

The preferred diisocyanate is methylene bis diphenyl diisocyanate, also known as diphenyl methane-p,p'-diisocyanate, hereinafter referred to as MDI. Other operable diisocyanates are the aliphatic diisocyanates containing 2 to 12 carbon atoms, such as tetramethylene diisocyanate, hexamethylene diisocyanate and the like; the cycloaliphatic diisocyanates, such as cyclohexyl diisocyanate and the like; the aromatic diisocyanates containing 6 to 18 carbon atoms in the ring(s), such as the phenyl diisocyanates, the toluene diisocyanates and the like; the dicycloaliphatic diisocyanates containing 8 to 16 carbon atoms in the rings, such as cyclohexyl methane diisocyanate and the like; and the diaryl diisocyanates, such as MDI, dichloro-diphenyl methane diisocyanate, dimethyl diphenyl methane diisocyanate, diphenyl dimethyl methane diisocyanate, dibenzyl diisocyanate, diphenyl ether diisocyanate and the like. The amount of diisocyanate used to react with the hydroxy-terminated polycarbonate and chain extender depends on the quantity of polycarbonate and free glycol, if any, present in the composition. The number of mols of diisocyanate will be substantially equal to the sum total of the number of mols of polycarbonate and chain extender(free glycol). The result is that the polyurethane formed is essentially free of NCO(isocyanate) groups, although, generally, mols of diisocyanate per mol of the hydroxyl-terminated polycarbonate and chain extender can vary from 0.95 to 1.01.

The nylon fabric substrate having utility in the present invention is formed by conventional methods which are well known to the art and to the literature, several of which are outlined below. It is understood that the various nylon fabric substrates discussed below merely are examples of suitable nylon fabric substrates having utility in the present invention, but that other nylon fabric substrates could be utilized in the present invention without affecting the concept thereof.

Nylons are synthetic polymers that contain an amide group, —CONH—, as a recurring part of the chain. There are exceptions. For example, although polyalpha-amino acids, such as synthetic proteins, meet this specification, they are not identified as nylons. Another class of polyamide resins that are not nylons is based on dimerized vegetable oil acids and polyamines such as ethylene diamine or diethylene triamine. These are relatively low in molecular weight (2000 to 10,000), are more soluble and flexible than nylons, and they vary from liquids to low-melting-point solids.

Nylons are made from (a) diamines and dibasic acids, (b) omega-amino acids, or (c) lactams.

Nylons are identified by numbers corresponding to the number of C-atoms in the monomers (diamine first, for (a) above). Nylon 6/6 is the reaction product of hexamethylene diamine and adipic acid, poly(hexamethylene adipamide), $H[NH(CH_2)_6NHCO(CH_2)_4CO]_nOH$; nylon 11, poly(11-aminoundeconoic acid), is prepared from 11-aminoundeconoic acid; and nylon 6, polycaprolactam, is preferred from epsilon-caprolactam. Nylon 6/12 is made from hexamethylene diamine and the 12-carbon acid, dodecanedioic acid, or $HOOC(CH_2)_{10}COOH$. The molecular weights of nylons range from 11,000 to 34,000. They usually are semicrystalline polymers with melting points in the range of 350° to 570° F.

Other commercial nylons that may be useful in the practice of this invention are 6/9, 6/10, 10, 12, and the recently introduced 4/6 and 12/12. The more C-atoms, that is the lower the concentration of amide groups, the lower the melting point, with the proviso that nylons in which the amides are separated by an even number of C-atoms melt higher than those of similar amide concentration with an odd number of C-atoms.

According to the embodiments of the present invention, the $AR(OH)_n$ in a polar solvent is utilized in association with a polyurethane adhesive to form a formaldehyde-free adhesive system. The $AR(OH)_n$ may also be added directly to the polyurethane adhesive to form an adhesive admixture. The polyurethane adhesive is generally made from a polycarbonate or polyether intermediate or more desirably a polyester intermediate such as those set forth hereinabove with regard to the description of the various polyurethane coatings and the same is hereby fully incorporated by reference. Accordingly, by way of a brief review, the preferred polyester intermediate is made with dicarboxylic acid having from 2 to 10 carbon atoms with adipic acid being preferred. The glycol which is reacted with the dicarboxylic acid to form the polyester intermediate generally has from 2 to 10 carbon atoms with butane diol being preferred. Desirably a slight excess (e.g. from about 1.05 to about 1.5 equivalents) of the glycol is utilized to provide a hydroxyl-terminated polyester intermediate having a number average molecular weight of from about 500 to about 10,000 and preferably from about 600 to about 1,500. A glycol chain extender is utilized in association with the hydroxyl terminated polyester intermediate as in a mixture or blend, with the blend subsequently being reacted with a polyisocyanate. Suitable chain extenders have from 2 to 10 carbon atoms with butane diol being preferred. Various polyisocyanates can be utilized with generally aromatic diisocyanates being preferred. Examples of such suitable isocyanates include those set forth hereinabove with MDI being preferred. The amount of the chain extender is generally from about 0.1 to about 2.1 moles for every mole of the polyester intermediate. The number of moles of the polyisocyanate, based upon the total number of moles of the hydroxyl-terminated polyester intermediate and the chain extender is from about 0.95 to about 1.12 and preferably from about 0.98 to about 1.06. Further details with regard to the preparation of such urethanes are set forth in U.S. Pat. Nos. 2,770,612; 2,871,218; 3,015,650; 4,397,974; and 4,542,170, which are hereby fully incorporated by reference. The polyurethane is generally contained in a solvent.

The hydroxy aromatic compounds of $AR(OH)_n$ also form a part of the adhesive bond. The $AR(OH)_n$ may be utilized in one of several ways. The polyurethane coated nylon fabrics may be precoated with $AR(OH)_n$. The $AR(OH)_n$ precoat can be applied to the polyurethane-coated nylon fabrics via dusting, spraying or brushing, after which the adhesive is applied. Desirably, a solution of $AR(OH)_n$ in a polar solvent is utilized to precoat the polyurethane coated nylon fabrics followed by application of the adhesive. Additionally, $AR(OH)_n$ may be added directly to the polyester urethane adhesive to form an adhesive admixture. This admixture is then applied to the polyurethane coated nylon fabrics.

When a solution of $AR(OH)_n$ in a polar solvent is employed, the polar solvents utilized are alcohols having from 1 to 5 carbon atoms, ketones having from 3 to 7 carbon atoms, tetrahydrofuran and water. Ethanol and methyl ethyl ketone are preferred solvents. The amount of $AR(OH)_n$ in the solvent is from about 5 to about 60 percent by weight, preferably from 10 to 50 and most preferably from 20 to 40 percent by weight based on the total weight of AR(OH)$_n$ and the solvent. The precoating may be carried out by brushing, spraying, or rolling of the AR(OH)$_n$ solution. The solvent is allowed to evaporate before a coat of adhesive is applied.

As stated above, in the formula AR(OH)$_n$, AR represents an aromatic moiety such as a benzene or naphthalene nucleus and n is an integer of from 1 to 3. Reagents that satisfy the parameters of the above formula are phenol, alpha-naphthol, beta-naphthol, catechol, resorcinol, hydroquinone, 1,2-dihydroxynaphthalene, 1,3-dihydroxynaphthalene, 1,4-dihydroxynaphthalene, 1,5-dihydroxynaphthalene, 1,6-dihydroxynaphthalene, 1,7-dihydroxynaphthalene, 1,8-dihydroxynaphthalene, as well as isomers of trihydroxybenzenes and trihydroxynaphthalenes. Preferably, AR(OH)$_n$ is resorcinol.

The use of AR(OH)$_n$, either in a polar solvent or in the adhesive, eliminates the decay of peel strength of the surface seams made from aluminum filled polyurethane coated nylon fabric and a polyurethane coated nylon fabric or from two polyurethane coated nylon fabrics. The use of AR(OH)$_n$ improves adhesion of the polyurethane-to-nylon and polyurethane-to-polyurethane interfaces. Bonded compositions so formed have utility in escape slides for aircraft, air bags for automobiles, canopies, and tents.

Samples prepared with the resorcinol in a polar solvent as well as a resorcinol-modified polyurethane adhesive admixture for the polyurethane coated nylon fabrics were tested for peel strength according to Federal Test Method Standard No. 191A, Method 5960, with the modification that the test specimens were pulled at the rate of 2.0 inches per minute. Fabrics are coated fabrics, and whenever the word fabric is used, it is in the context of a coated material unless noted otherwise. The fabrics consist of a nylon 6/6 woven construction. On one side they are coated with an air retentive layer made of a polyether polyurethane containing fire retardants, fungicides, antioxidants, and other additives. On the other side they are coated with a thinner layer of polyether polyurethane containing aluminum powder in flake or granular form. Which type of aluminum is used is determined by the manufacturer of the fabric. A schematic of the fabric cross-section is shown in FIG. 1. Thickness will vary because the uncoated fabric surface is not smooth.

The adhesive (A1503B) is a solvent-based mixture containing about 20 weight percent polyester urethane made by the BFGoodrich Adhesives Systems Division. This adhesive is made from adipic acid and butane diol to form the polyester intermediate. The polyester intermediate is blended with a chain extender, also a butane diol. The blended polyester intermediate is then reacted with MDI (diphenylmethane-4,4'-diisocyanate) to form the adhesive. Any other polyester, polyether or polycarbonate-based polyurethane adhesive can be used. Although improved adhesive properties are observed in an accelerator-free adhesive used in association with resorcinol of the present invention, an accelerator is preferred for achieving better overall heat and water resistance of the adhesive due to better stability of the adhesive resulting from cross-linking of the adhesive compound in the presence of the accelerator. Suitable accelerators used in conjunction with such adhesives are relatively low molecular weight polymers or oligomers such as oligomers of one or more isocyanates and/or polyisocyanates which are well known to the art and to the literature. Examples of the isocyanates include methylene bisphenyl isocyanate and polymethylene polyphenyl isocyanate, and examples of the polyisocyanates include diisocyanates such as methylene bis-(4-phenylisocyanate) (MDI), 1,6-hexane diisocyanate (HDI), 2,4 tolylene diisocynanate (80 percent weight) and 2,6 tolylene diisocyanate (20 percent weight) (80/20 TDI), methylene bis(4-cyclohexylisocyanate) (H$_{12}$ MDI), and isophorone diisocyanate. A preferred polymeric accelerator reaction product is PAPI 2027 (also known as PAPI 27), comprising from about 40 percent to about 50 percent diphenylmethane diisocyanate containing methylene bisphenyl isocyanate and from about 50 to about 60 percent polymethylene polyphenyl isocyanate, available from Dow Chemical of Midland, Mich. Thus, an adhesive system (i.e., adhesive plus accelerator) preferably is used rather than an accelerator-free adhesive. Suitable adhesive systems are those available from the BFGoodrich Adhesive Systems Division and represented by the codes ADH-1 and ADH-2. The resorcinol is obtained from Fisher Scientific or Koppers Chemicals. The equivalent weight of resorcinol is 55 (based on OH functionality).

Tables I through VI are directed to the use of a precoat of resorcinol in a polar solvent followed by the application of the polyester polyurethane adhesive.

Table I gives data for a 60 percent resorcinol solution in ethanol used as a primer for the aluminum-polyurethane coated fabric versus an unprimed surface. This fabric has two sides, an aluminum side and a "yellow" or non-aluminum side. The fabric is rolled into a tube such that the aluminum side and yellow side come in contact. First the primer, then the adhesive is applied in the contact area. Improved adhesion and a decrease in the decay of peel strength is obtained when a resorcinol primer is employed. The fabric, NS-452B, was wiped prior to the primer application. Another suitable fabric is NS-452A. The NS-452A and NS-452B fabrics are available from BFGoodrich, the assignee of the present invention, and both meet or exceed FAA Technical Standard Order TSO-C69b, which is directed to characteristics of fabrics acceptable for use in inflatable escape slides. The surface was primed, adhesive applied and then bonding commenced. The use of resorcinol improved adhesion such that the bonded fabric that previously had failed peel tests now easily passed the test (>6 lbs./in. after five days).

TABLE I

| Sample[1] | Unprimed Peel lbs./in. at 5 days | Primed Surface | | |
|---|---|---|---|---|
| | | Peel at 2 days | Peel at 7 days | Peel at 14 days |
| 1 | 4.0 | 11.0 | 11.8 | 12.1 |
| 2 | 3.8 | 11.3 | 8.1 | 8.5 |
| 3 | 5.5 | 10.8 | 10.0 | 9.5 |
| 4 | 5.4 | 11.0 | 8.4 | 8.9 |
| 5 | 4.4 | 11.2 | 10.0 | 10.4 |
| 6 | 5.6 | 17.0 | 13.7 | 12.5 |
| 7 | 5.5 | 14.1 | 11.8 | 11.0 |
| 8 | 4.0 | 10.7 | 11.0 | 11.0 |

[1] NS-452B fabric

The results in Table II show that the resorcinal concentration and solvent can be varied over a wide range and still produce a large improvement in adhesion without a decay of peel strength below acceptable values. Each fabric sample was washed with methyl ethyl ketone (MEK) prior to primer application. This fabric is "tubed" as per the samples in Table I.

TABLE II

| Sample[1] | % Resorcinol | Solvent | Peel Day 2 | Peel Day 7 | Peel Day 14 |
|---|---|---|---|---|---|
| 1 | 0 | none | 5.7 | 4.1 | 4.3 |
| 2 | 60 | ETOH | 12.4 | 11.4 | 11.6 |
| 3 | 30 | ETOH | 10.7 | 9.7 | 9.3 |
| 4 | 60 | MeOH | 12.3 | 11.0 | 10.5 |
| 5 | 60 | THF | 10.6 | 11.0 | 12.3 |
| 6 | 10 | THF | 7.2 | 7.0 | 7.5 |
| 7 | 40 | MEK | 10.1 | 8.7 | 9.5 |
| 8 | 30 | MEK | 10.2 | 9.7 | 9.1 |
| 9 | 20 | MEK | 7.1 | 7.2 | 7.5 |
| 10 | 40 | $H_2O$ | 9.5 | 9.6 | 8.9 |
| 11 | 30 | $H_2O$ | 8.7 | 8.6 | 8.0 |

[1]NS-452B fabric

Table III shows the length of time between priming and application of the adhesive. The results in this Table show that time is not critical to the use of the primer. The fabric is "tubed" as per the samples in Table I.

TABLE III

| Sample[1] | Time after Primer Minutes[2] | Peel Day 3 | Peel Day 7 |
|---|---|---|---|
| 1 | no primer | 5.4 | 4.9 |
| 2 | 1 | 10.5 | 10.3 |
| 3 | 5 | 10.7 | 9.5 |
| 4 | 15 | 12.7 | 12.5 |
| 5 | 25 | 12.3 | 11.3 |
| 6 | 40 | 13.6 | 13.0 |

[1]NS-452B fabric
[2]40 percent resorcinol in MEK
Note:
Same results are obtained for 40 percent resorcinol in water.

It was important to determine if the age of the primer solution has an effect on adhesion. It was found that the solution could be used for at least eight days before a precipitate formed (Table IV). It is possible that the resorcinol is reacting with the MEK to form an insoluble product. This fabric is "tubed" as per the sample in Table I.

TABLE IV

| Sample[1] | Age of Primer Solution (Days) | Peel Day 2 | Peel Day 7 | Peel Day 14 |
|---|---|---|---|---|
| 1 | No primer | 2.9 | 2.3 | 2.2 |
| 1A | Freshly prepared | 12.5 | 11.6 | 9.9 |
| 2 | No primer | 2.4 | 1.8 | 1.7 |
| 2A | 1 | 12.8 | 12.4 | 11.0 |
| 3 | No primer | 1.7 | 1.7 | — |
| 3A | 2 | 10.8 | 10.6 | — |
| 4 | No primer | 2.3 | 2.1 | 4.0 |
| 4A | 3 | 9.3 | 9.5 | 9.7 |
| 5 | No primer | 2.3 | 4.1 | 2.8 |
| 5A | 6 | 9.3 | 9.5 | 12.3 |
| 6 | No primer | 3.3 | 2.8 | — |
| 6A | 8 | 12.4 | 12.5 | — |

[1]NS-452B Fabric

Since resorcinol is water-soluble, it is possible that the use of the compound as a primer might reduce the peel strength under humid conditions. Therefore, to test the effect of water on the peel strength, samples were soaked under water for one week at 50° C. and then retested. The results in Table V show that the samples retained more than 90 percent of their original peel strength. The resorcinol does not reduce peel strength, but actually improves it.

TABLE V

| Sample[1] | % Resorcinol | Solvent | Initial Peel Strength[2] | Peel Strength After 1 Week at 50° C. in $H_2O$ | % Peel Retained |
|---|---|---|---|---|---|
| 1 | 60 | ETOH | 7.5 | 6.8 | 90.9 |
| 2 | 60 | ETOH | 13.1 | 12.8 | 97.7 |
| 3 (Control) | 0 | None | 2.5 | 1.84 | 73.5 |

[1]NS-452B Fabric
[2]4 days

The concentration of the polyisocyanate accelerator in the adhesive can be varied to improve adhesion in the samples. The results in Table VI show that resorcinol gives improved adhesion at all levels of accelerator used in the adhesive.

TABLE VI

| Sample[1] | % Accelerator | Primer[2] | Peel Strength Day 2 | Peel Strength Day 7 | Peel Strength Day 14 |
|---|---|---|---|---|---|
| 1 | 0 | No | 4.3 | 3.5 | 3.2 |
| 2 | 0 | Yes | 11.9 | 12.4 | 11.1 |
| 3 | 4 | No | 6.4 | 7.3 | 7.3 |
| 4 | 4 | Yes | 18.0 | 17.8 | 16.8 |
| 5 | 8 | No | 2.9 | 2.4 | 3.3 |
| 6 | 8 | Yes | 13.6 | 12.6 | 12.6 |
| 7 | 16 | No | 2.4 | 1.9 | 1.9 |
| 8 | 16 | Yes | 11.8 | 10.9 | 10.7 |

[1]NS-452B fabric
[2]Primer = 30 percent resorcinol in MEK

Table VI also shows that even without accelerator (Samples 1 and 2), the adhesion is improved when using resorcinol. This demonstrates that resorcinol improves adhesion in two ways. One involves a reaction with accelerator, and a second way involves direct reactions between the acidic phenol group in resorcinol and the basic carbamate group in the urethane. Since resorcinol and urethane are multifunctional, they improve adhesion between layers by forming both intramolecular and intermolecular bonds.

Tables VII to X are directed to the use of resorcinol that is added to the polyester urethane adhesive to form an adhesive admixture.

In this series, the effective resorcinol/polyisocyanate accelerator ratio on the cohesive strength of the aluminum layer is measured. The compositions are based on 100 grams of adhesive and 8.8 grams of the accelerator to which varying amounts of resorcinol were added. The concept of equivalent weight has been introduced because various polyisocyanate accelerators could be used which have different molecular weights and functionalities. Thus, the preferred weight of accelerator could be different depending on the molecular weight and functionality thereof. By expressing the amount of accelerator and resorcinol used as equivalents, or more specifically, in terms of an equivalence ratio (eq/eq), all polyisocyanate accelerators can be encompassed with one set of numbers. The adhesive and accelerator are as disclosed prior to Table I.

The results in Table VII indicate that improvement in cohesive strength of the aluminum layer with resorcinol occurs when the equivalence ratio is above 1.5.

TABLE VII

| Sample[2] | Resorcinol (g) | eq/eq | Peel Strength After 2 Days |
| --- | --- | --- | --- |
| 1 | 0 | 0 | 6.4 |
| 2 | 2.0 | 0.55 | 6.0 |
| 3 | 4.0 | 1.1 | 6.4 |
| 4 | 6.0 | 1.65 | 9.0 |
| 5 | 8.0 | 2.2 | 11.2 |

[2]NS-452B Fabric

Table VIII shows the effect of resorcinol/accelerator ratio and the effect of time on adhesion strength with fabric. The results in Table VIII show further than an equivalence ratio greater than 1.5 affords improved peel strength on the aluminum side. With the resorcinol modified adhesive, peel strength improved with aging whereas the control (Sample 1) showed no change or a loss in peel strength with time.

TABLE VIII

| Sample[2] | Resorcinol (g) | (eq/eq) | Peel Strength | | |
| --- | --- | --- | --- | --- | --- |
| | | | Day 1 | Day 2 | Day 3 |
| 1 | 0 | 0 | 6.4 | 6.4 | 5.6 |
| 2 | 9.0 | 2.5 | 8.6 | 9.6 | 9.2 |
| 3 | 16.5 | 4.6 | 7.7 | 13.0 | 15.7 |

In Table IX, the effect of resorcinol/accelerator ratio on aluminum side adhesion is examined further at still higher equivalence ratios and with two polyether urethane coated fabrics. At the highest level (eq/eq=6.5) of resorcinol, it was observed that the adhesive took longer to lose tackiness and dry. From a practical point of view, even though the peel strengths were higher at this level, it was not a preferred level. The results indicate that the optimum peel strength was achieved at different levels for different fabrics; at about 5.2 for NS-452A and about 4.0 for NS-452B. This indicates that the optimum composition of this invention will be determined to some extent by the particular coated fabric used.

TABLE IX

| Sample | Fabric | Resorcinol (g) | (eq/eq) | Adhesion* (lb/in) |
| --- | --- | --- | --- | --- |
| 1 | 1 | 0 | 0 | 5.2 |
| 2 | 2 | 0 | 0 | 9.4 |
| 3 | 1 | 14.4 | 4 | 10.5 |
| 4 | 2 | 14.4 | 4 | 15.5 |
| 5 | 1 | 18.9 | 5.2 | 12.5 |
| 6 | 2 | 18.9 | 5.2 | 15.1 |
| 7 | 1 | 23.4 | 6.5 | 12.5 |
| 8 | 2 | 23.4 | 6.5 | 12.5 |

*average of 2 samples measured as peel strength after 7 days
Fabric 1 - NS-452A fabric
Fabric 2 - NS-452B fabric In Table X, results are listed for four different grades of resorcinol, from Koppers; tech DP, tech flake, USP crystals and USP powder. The tests were run using 7.7 grams of accelerator per 100 grams of adhesive, and 12.6 grams of resorcinol (eq/eq=4.0). Aluminum side adhesion was measured. In addition, the effect of time was tested. Regardless of the grade of resorcinol, the addition thereof to the polyurethane adhesive markedly improved the peel strength. After three days aging, cohesive failure in the aluminum layer occurred at about 11–12 lbs./inch compared to the control without resorcinol with a value of 6.3 lbs./inch. As noted in the results of Table X, the peel strength with the resorcinol modified adhesive improved with aging. In Table X, after 21 days the peel strength had increased from about 11 to 20+ lbs./inch. After aging 21 days, cohesive failure could not be made to occur in the aluminum layer, and it instead occurred preferentially in the adhesive layer.

TABLE X

| Resorcinol grade | Peel Strength[1] | |
| --- | --- | --- |
| | Day 3 | Day 21 |
| None | 6.3 | 4.7 |
| Tech DP | 11.8 | 20.0+ |
| Tech Flake | 11.8 | 22.6 |
| USP crystals | 11.5 | 20.5 |
| USP powder | 11.5 | 20.5 |

[1]Average of 4 Samples

Figure 2:
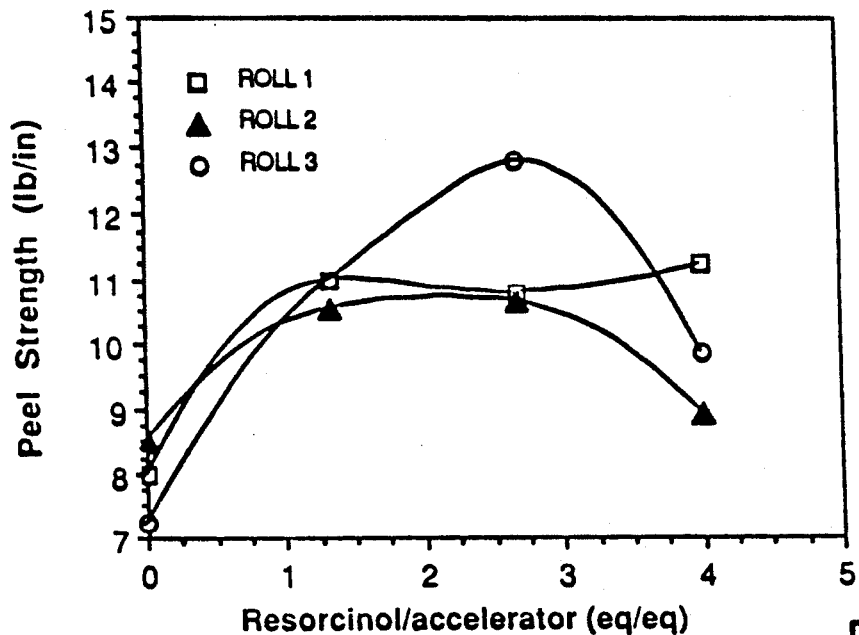
FIG. 2 shows the effect of resorcinol on yellow side adhesion results of three different rolls of NS-452A fabrics.

Peel strength on the air retentive side, the thicker layer in FIG. 1, can also be improved by the addition of resorcinol to the adhesive. FIG. 2 shows the peel strength results for three different rolls of NS-452A fabric at different levels of resorcinol. The adhesive system utilized was ADH-1 (at a level containing 100 grams of adhesive and 7.7 grams of accelerator) manufactured by the BFGoodrich Company. The response of each fabric is different, but two of the three samples showed a maximum peel strength around 1.33 to 2.67 (eq/eq). The occurrence of an Optimum was noted previously in the examples for aluminum side adhesion. The results in FIG. 2 indicate that the optimum ratio of resorcinol/accelerator may be different for adhesion on the air retentive side as compared to the aluminum side.

Figure 3:
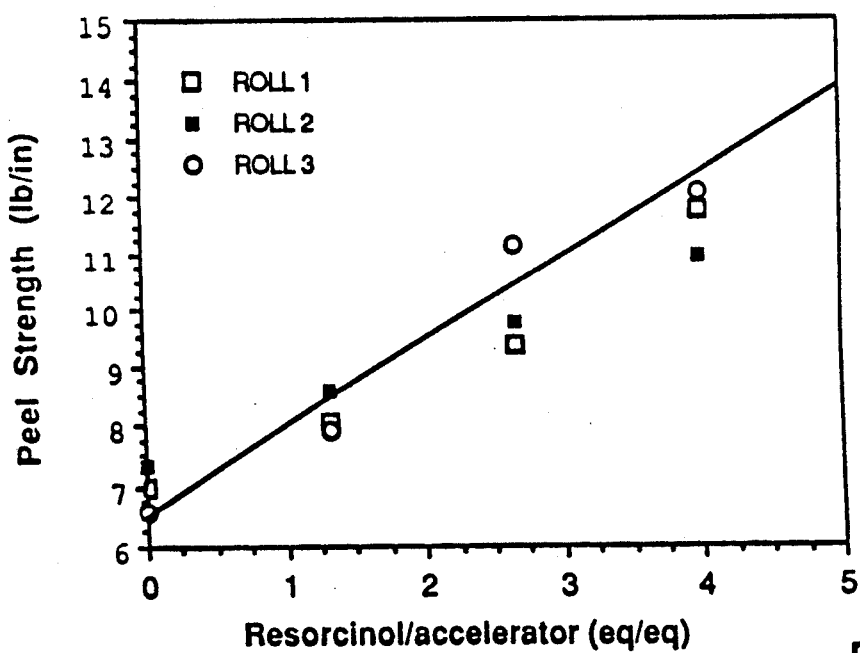
FIG. 3 shows the effect of resorcinol level after 11 days aging on aluminum side adhesion for NS-452B fabrics.
Figure 4:
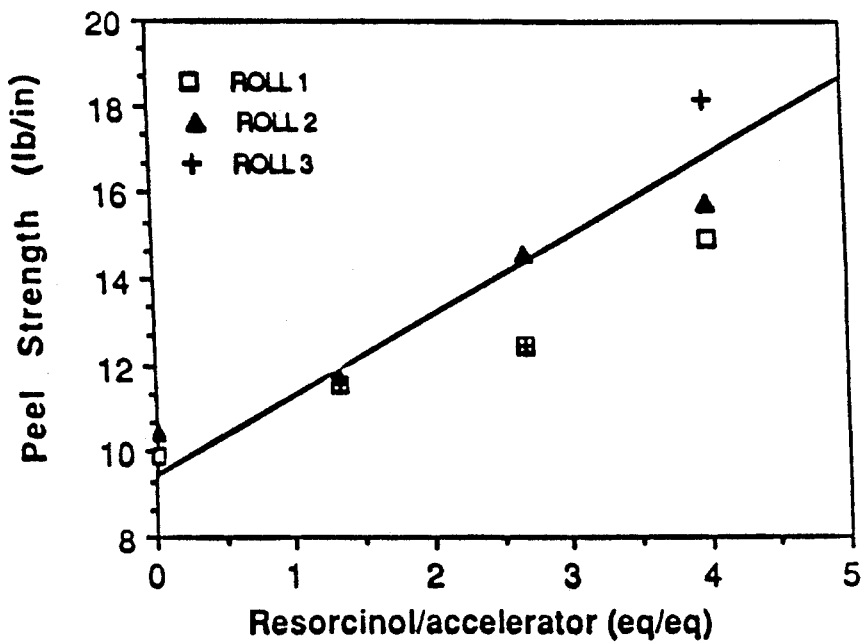
FIG. 4 shows the effect of resorcinol level after 11 days aging on aluminum side adhesion for NS-452A fabrics.

In examples described above, the amount of accelerator was 7.7 or 8.8 grams per 100 grams of adhesive mixture in the adhesive system. It is also beneficial to use resorcinol with 3.85 grams of accelerator per 100 grams of adhesive in the ADH-1 system. FIGS. 3 and 4 show the effect of resorcinol level on aluminum side adhesion after 11 days aging for two fabrics. In each case, three different samples were tested. In each case, the peel strength increased about 100 percent over the range studied, from an equivalence ratio of 1.0 to 4.0.

Figure 5:
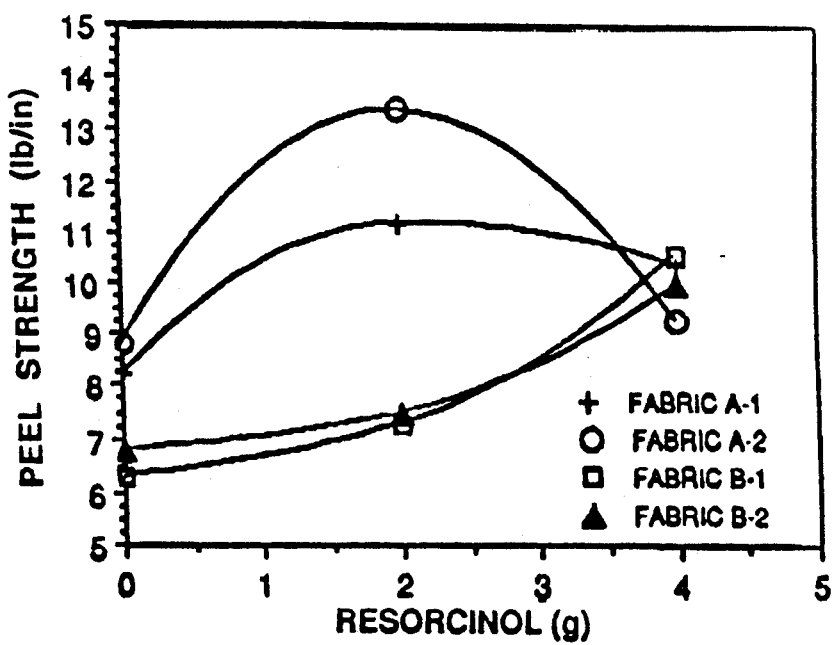
FIG. 5 shows the effect of resorcinol level after 7 days on aluminum side adhesion for two different fabric samples, wherein the weight ratio of adhesive:accelerator was 42.6:1.
Figure 6:
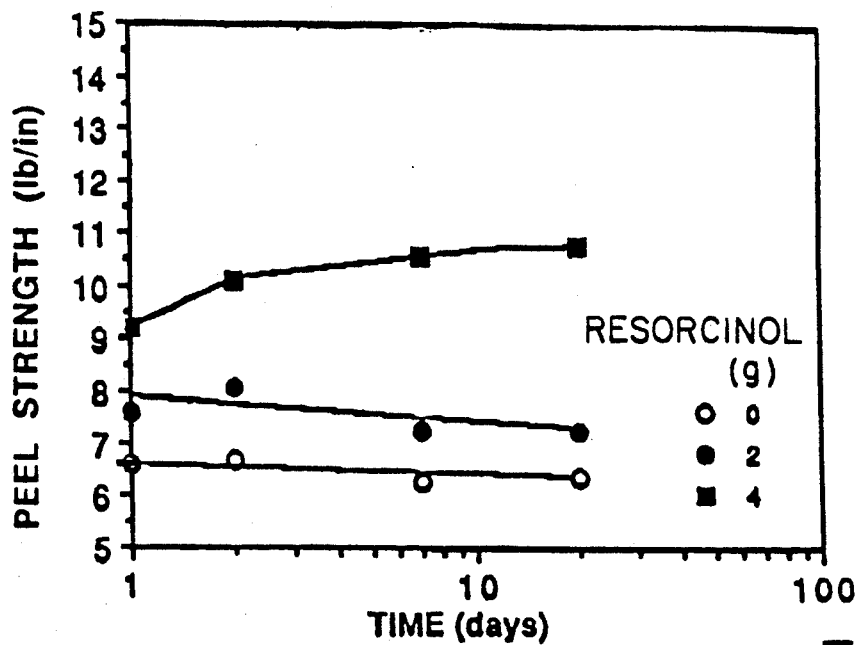
FIG. 6 shows the effect of resorcinol level over time on aluminum side adhesion for fabric sample B-1 of FIG. 5.
Figure 7:
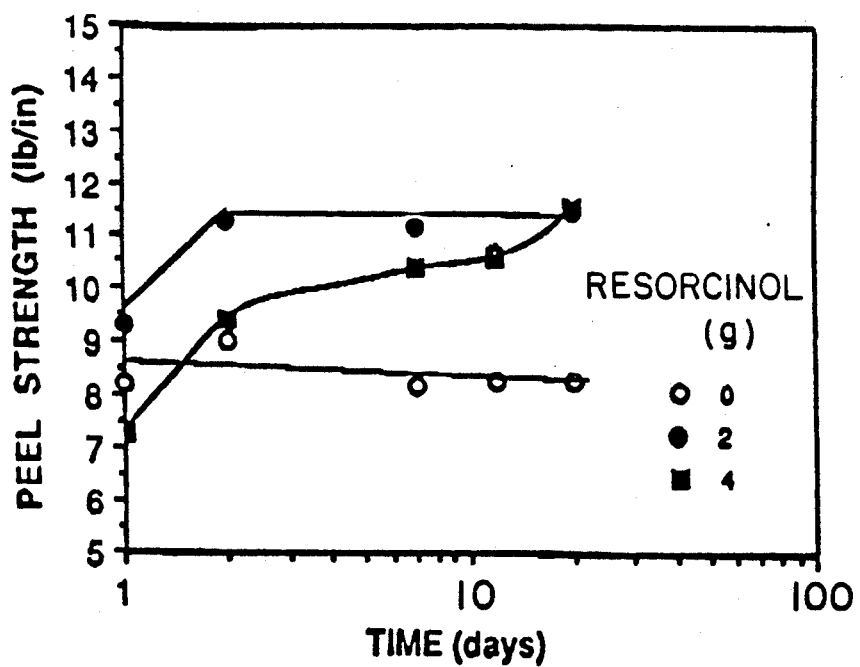
FIG. 7 shows the effect of resorcinol level over time on aluminum side adhesion for fabric sample A-1.

Another adhesive system, ADH-2, also was evaluated for the effect of resorcinol on aluminum side adhesion (see FIGS. 5 to 7). FIG. 5 shows the result for 4 different rolls of fabric, with 2 rolls being NS-452-A type fabric and designated fabric A and 2 rolls being NS-452-B type fabric and designated fabric B, when utilizing different levels of resorcinol and an adhesive:accelerator weight ratio of 42.6:1. Fabric A displayed optimum results at 2 grams of resorcinol, and fabric B displayed optimum results at 4 grams of resorcinol. FIG. 6 confirms the results of FIG. 5 for fabric B-1 when resorcinol is employed at a level of 4 grams. More particularly, after 20 days, using 4 grams of resorcinol resulted in a peel strength of 10.5 lbs. per inch in comparison to a peel strength of 6.5 lbs. per inch at 20 days for a sample free of resorcinol. Similarly, FIG. 7 confirms the results of FIG. 5 for fabric A-1 at a resorcinol level of 2 grams. More particularly, at 20 days using 2 grams of resorcinol, a peel strength of 11.5 lbs. per inch was obtained as compared to a peel strength of 8.5 lbs. per inch at 20 days for a sample free of resorcinol.

In Table XA set forth below, two adhesive systems each were evaluated for a resorcinal level of 0 grams per 100 grams of adhesive and 6 grams per 100 grams of adhesive, for the effect of resorcinol on aluminum side adhesion of fabric B roll 4. The adhesive:accelerator weight ratio was lowered to 24:1 for these samples. The results again show that use of resorcinol improved the performance of the adhesive system as measured by peel strength for both of the systems.

TABLE XA

| Adhesive System | ADH-1 | | ADH-2 | |
|---|---|---|---|---|
| Resorcinol (g/100 g of adhesive) | 0 | 6 | 0 | 6 |
| Peel strength (lb/in)* | 4.60 ± 0.14 | 8.58 ± 0.17 | 4.92 ± 0.33 | 7.72 ± 0.57 |

*after 6 days aging

The second embodiment of the present invention is directed to laminating a preformed polyurethane film to a nylon fabric using $AR(OH)_n$ and a formaldehyde-free adhesive to obtain a two-layer lamina. Further, one piece of this two-layer lamina may be bonded with either an additional nylon or polyurethane to form a nylon-polyurethane-nylon or polyurethane-nylon-polyurethane three-layer lamina. Additionally, two pieces of the two-layer lamina may be bonded together to form a four-layer lamina by bonding the nylon of the one two-layer lamina to the nylon of the other two-layer lamina, or the polyurethane of the two-layer lamina to the polyurethane of the other two-layer lamina to form a four-layer lamina of nylon-polyurethane-polyurethane-nylon or polyurethane-nylon-nylon-polyurethane. The adhesive is a polyurethane and as such the polyurethane adhesive chemistry disclosed above is hereby incorporated by reference. AR is a benzene or naphthalene nucleus and n is an integer of from 1 to 3.

The preformed polyurethane film is made from the same material as is the polyurethane coating described above and as such the polyurethane coating chemistry is hereby incorporated by reference. The preformed polyurethane film is made by calendering which is a specialty process for the manufacture of large volume and high quality products, mainly film and sheeting. Thickness may range from 1.0 to 10 mils off the calender.

The nylon having utility in this embodiment is a nylon fabric. The methods disclosed in the first embodiment for the preparation of nylon fabric applies to the second embodiment as well. Preferred nylon fabrics are made from Nylon 6, 6/6 or 6/10.

For a two layer lamina, lamination is effected by pressing the preformed polyurethane film to the nylon fabric in the presence of an adhesive and passing the lamina between heated rollers at a temperature of from about 80° C. to about 180° C., preferably from about 90° C. to about 170° C., and most preferably from about 100° C. to about 170° C. and at a pressure of from about 20 psig to about 100 psig, preferably from about 30 to about 90 psig, and most preferably from about 40 to about 90 psig. Either the polyurethane film or the nylon fabric may be precoated with an ethyl alcohol solution containing up to about 40 percent, and preferably up to about 30 percent of $AR(OH)_n$ prior to application of the adhesive. Before the adhesive is applied over the precoat, the alcohol is permitted to evaporate off. A formaldehyde-free adhesive with a ketone solvent is applied over the precoat surface and also to the other surface to be bonded that is not precoated. The ketone solvent comprises a ketone having from 3 to 8 carbon atoms such as acetone, methyl ethyl ketone, diethyl ketone, the methyl butyl ketone, and the ethyl butyl ketone. Preferred is methyl ethyl ketone. The ketone is present at from about 25 percent up to about 60 percent and preferably from about 30 percent up to about 50 percent by weight. Before the two surfaces are bonded, the ketone is permitted to evaporate off. Optionally, $AR(OH)_n$ may be contained in the adhesive. When $AR(OH)_n$ is in the adhesive, a premix is prepared. When the $AR(OH)_n$ is an adhesive premix, the $AR(OH)_n$ is present at from about 5 percent to about 25 percent, preferably from about 7 percent to about 21 percent, and most preferably from about 9 percent to about 18 percent by weight based on the weight of $AR(OH)_n$ and the adhesive. $AR(OH)_n$ is dissolved in a small amount of ketone and the formaldehyde-free adhesive is blended in. Prior to the utilization of the adhesive, additional ketone is added. Within this latter blend, the $AR(OH)_n$ is present at from about 3 to about 10 percent, preferably 4 to 8, and most preferably from about 5 to about 8 percent by weight. The formaldehyde-free adhesive is present at from about 30 percent to about 55 percent, preferably from about 31 percent to about 52 percent, and most preferably from about 35 percent to about 52 percent by weight. The ketone is present at from about 35 percent to about 67 percent by weight. Within the adhesive blend, the level of $AR(OH)_n$ and formaldehyde-free adhesive is determined and the ketone added to give 100 percent blend. The ketones are as defined above.

Figure 8:
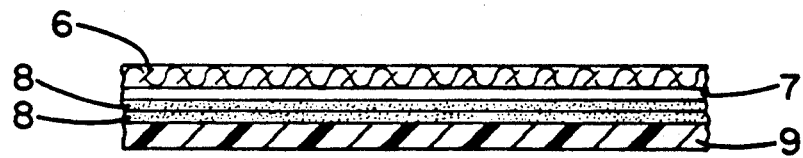
FIG. 8 is a cross-sectional view of a nylon fabric bonded to a polyurethane film wherein one side of the nylon fabric is precoated with an ethanol solution of AR(OH)$_n$. This precoated side of nylon fabric as well as one side of the polyurethane film are coated with adhesive and the two adhesive-coated sides are bonded together to form a two-layer lamina.
Figure 9:
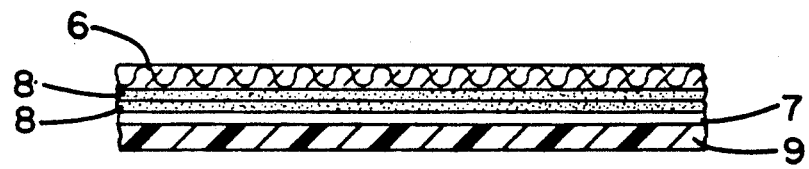
FIG. 9 is a cross-sectional view of a nylon fabric bonded to a polyurethane film wherein one side of the polyurethane film is precoated with an ethanol solution of AR(OH)$_n$. This precoated side of the polyurethane film as well as one side of the nylon fabric are coated with adhesive and the two adhesive-coated sides are bonded together to form a two layer lamina.

In practicing the second embodiment of the invention, a lamina is formed from at least two different components as shown in FIGS. 8 and 9. A preformed polyurethane film 9 is bonded to a nylon fabric 6 by means of an adhesive layer 8. The adhesive layer 8 comprises a formaldehyde-free adhesive and a ketone. The $AR(OH)_n$ precoat 7 is applied onto the preformed polyurethane film 9 or onto the nylon fabric 6 and the adhesive layer applied over the precoat 7 after the alcohol has evaporated and to the other surface that is not precoated. Alternatively, $AR(OH)_n$ may be added to the adhesive and then applied to either surface 6 or 9, of which one surface is precoated. Regardless of whether $AR(OH)_n$ is in the adhesive layer or not, nylon fabric 6 and film 9 are then bonded under pressure and elevated temperature.

Figure 10:
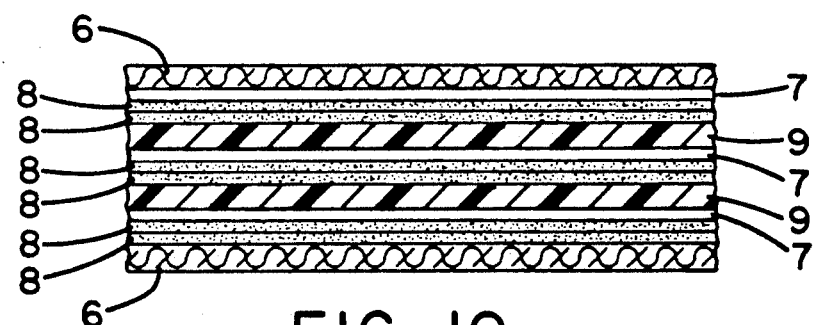
FIG. 10 is a cross-sectional view of a four-layer lamina formed by adhering the polyurethane films of the laminas of FIGS. 8 and 9 to each other in accordance with the present invention.
Figure 11:
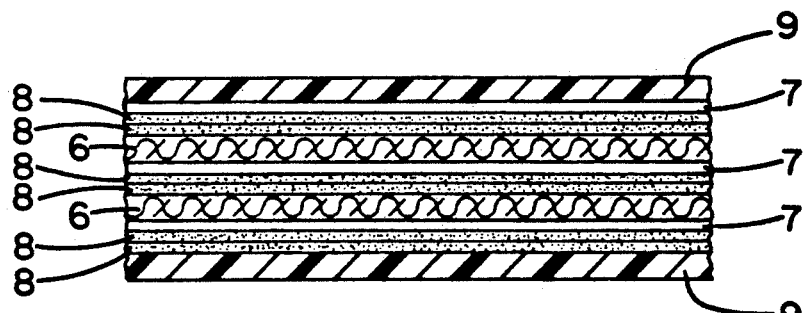
FIG. 11 is a cross-sectional view of a four-layer lamina formed by adhering the nylon fabric layers of the laminas of FIGS. 8 and 9 to each other in accordance with the present invention.

A four-layer lamina depicted in FIG. 10 or FIG. 11 is formed by bonding together the two-layer laminas of FIGS. 8 and 9. Two lamina of either FIG. 8 or FIG. 9 may be bonded in a nylon fabric, polyurethane film, polyurethane film, nylon fabric configuration as shown in FIG. 10, or in a polyurethane film, nylon fabric, nylon fabric, polyurethane film configuration as shown in FIG. 11. It is also within the purview of this invention to form a three-layer lamina of nylon fabric, polyurethane film, nylon fabric or polyurethane film, nylon fabric, polyurethane film.

The nylon fabrics utilized in the Examples below are of a specific weight, i.e., denier. Denier is defined as the weight in grams of 9,000 meters of fiber. That is, 9,000 meters of a fiber that weighs 121 grams has a denier of 121.

Table XI shows the increase in peel strength on lamina of preformed polyurethane film and nylon fabric. Control samples 1, 2 and 3 utilize no resorcinol precoat on the nylon fabric. Other samples within Table XI employ a precoat of 30 percent resorcinol in ethyl alcohol on the nylon fabric. No resorcinol is employed in the adhesive.

TABLE XI

| Sample | Nylon Fabric Denier | Polyurethane Film Precoat | Nylon Fabric Precoat | Adhesive Solution Adhesive: MEK Ratio | Peel Strength 2 Days | % Improvement in Peel Strength |
|---|---|---|---|---|---|---|
| 1 | 225.4 | — | — | 50:50 | 5.3 | — |
| 2 | 231.3 | — | — | 60:40 | 9.3 | — |
| 3 | 72.8 | — | — | 70:30 | 12.4 | — |
| 4 | 225.4 | — | yes | 50:50 | 13.0 | 145 |
| 5 | 231.3 | — | yes | 60:40 | 16.6 | 79 |
| 6 | 72.8 | — | yes | 70:30 | 15.9 | 28 |

The percent improvement in peel strength utilizing a 30 percent $AR(OH)_n$ precoat is at least about 10 percent and preferably about 15 percent.

The results in Table XI show the improvement in peel strength of a lamina by precoating a nylon fabric with a 30 percent solution of resorcinol in ethanol.

Within Table XII, the peel strength of the lamina is measured on 30 percent resorcinol in ethanol solution being precoated on either the preformed polyurethane film or the nylon fabric when utilizing an adhesive premix containing 11 percent resorcinol. Samples 7, 10 and 13 are control samples in that no precoating of the preformed polyurethane film and nylon fabric is used.

The percent improvement in peel strength utilizing a 30 percent $AR(OH)_n$ precoat and an adhesive premix containing 11 percent $AR(OH)_n$ is at least about 10 percent and preferably about 20 percent.

TABLE XII

| Sample | Denier | Polyurethane Film Precoat | Nylon Fabric Precoat | 11% Resorcinol Adhesive Premix Premix: MEK Ratio | Peel Strength 2 Days | % Improvement in Peel Strength |
|---|---|---|---|---|---|---|
| 7 | 225.4 | — | — | 50:50 | 6.4 | — |
| 8 | 225.4 | — | yes | 50:50 | 11.9 | 86 |
| 9 | 225.4 | yes | — | 50:50 | 21.0 | 228 |
| 10 | 231.3 | — | — | 70:30 | 1.5 | — |
| 11 | 231.3 | — | yes | 70:30 | 9.5 | 533 |
| 12 | 231.3 | yes | — | 70:30 | 12.3 | 720 |
| 13 | 72.8 | — | — | 70:30 | 7.9 | — |
| 14 | 72.8 | — | yes | 70:30 | 15.3 | 94 |
| 15 | 72.8 | yes | — | 70:30 | 19.5 | 147 |

Figure 12:
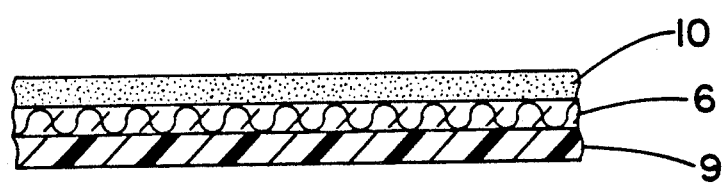
FIG. 12 is a cross-sectional view of a polyurethane-coated nylon fabric, wherein one side of the fabric is coated with polyurethane, and the opposite side is coated with aluminum in polyurethane.

The third embodiment of the present invention is directed to a composition of a peel strength-improving additive and $AR(OH)_n$ wherein the composition is either blended with a formaldehyde-free adhesive composition or preferably utilized as a precoat in association with the adhesive composition. The adhesive is a polyurethane and as such the polyurethane adhesive chemistry discussed above with respect to the first two embodiments of the present invention is hereby fully incorporated by reference. AR is a benzene or naphthalene nucleus and n is an integer of from about 1 to about 3. An adhesive bond is formed between two opposite sides of the same fabric for use in applications such as aircraft escape chutes and the like, wherein the fabric is a coated fabric, and whenever the word fabric is used it is in the context of a coated material unless otherwise noted. The fabric consists of a nylon woven construction having a polyurethane coating on one side and a polyurethane coating containing aluminum powder in flake or granular form on the other side. Which type of aluminum is used is determined by the manufacturer of the fabric. FIG. 12 depicts the coated fabric wherein 9 is the polyurethane coating, 6 is the nylon fabric, and 10 is the aluminum in polyurethane coating.

The polyurethane coating and aluminum in polyurethane coating are the same as previously discussed above for the first embodiment of the present invention, and as such are hereby fully incorporated by reference.

The nylon having utility in this embodiment is a nylon fabric. The methods disclosed above for the preparation of nylon fabric apply to the third embodiment as well, and as such are hereby fully incorporated by reference. Preferred nylon fabrics are made from Nylon 6, 6/6 or 6/10.

The peel strength-improving additives having utility in the present invention comprise a blend of a titanium or zirconium and silicone base, and preferably a titanium or zirconium base alone having —OH, —SH, —NH$_2$ or phosphorous functional groups or combinations thereof. A peel strength-improving additive having an —NH$_2$ functional group is represented by the formula

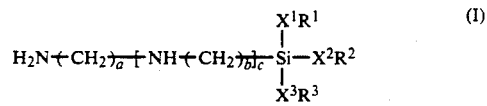

wherein a and b are independently integers of from about 1 to about 6, c is zero or 1; $X^1$, $X^2$ and $X^3$ are independently oxygen or non-existent; $R^1$, $R^2$ and $R^3$ are alkyl groups independently containing from about 1 to about 8 carbon atoms. When c is zero, a is preferably 3 or 4, and $R^1$, $R^2$ and $R^3$ are independently either methyl or ethyl. Most preferably a is 3, $X^1$, $X^2$ and $X^3$ are non-existent and $R^1$ is methyl while $R^2$ and $R^3$ are ethyl to give

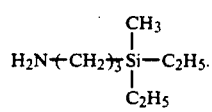

When a is 4, no more than one of $X^1$, $X^2$ or $X^3$ is oxygen, and $R^1$, $R^2$ and $R^3$ are methyl to give

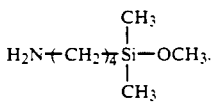

When a is 3; $X^1$, $X^2$ and $X^3$ are oxygen; and $R^1$, $R^2$ and $R^3$ are ethyl to give

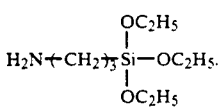

When c is 1, a preferably is 2 or 3 and b preferably is 3 with the following compounds being the most preferred:

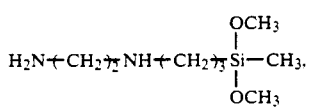

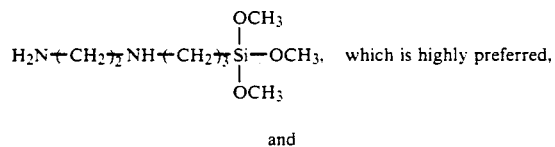 which is highly preferred, and

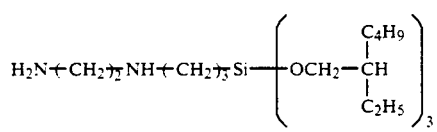

Another class of compounds having $NH_2$ functionality are the diamino alkanes of the formula $H_2N(CH_2)_{2-6}NH_2$ with 1,3-diaminopropane being preferred.

A compound having —SH functionality is a mercapto-terminated low molecular weight polyethylene sulfide of the formula $HS(CH_2CH_2 S)_e H$ wherein e is not more than 16.

A compound having a phosphorus functionality is of the formula $R^4OTi(-O-X-R^5-Y)_d$   or   (II)

$R^4OZr(-O-X-R^5-Y)_d$   (IIA)

wherein $R^4$ is an alkyl group containing from about 2 to about 40 carbon atoms, X comprises

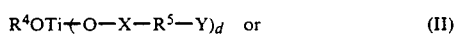

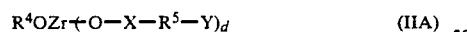

and Y comprises —$NH_2$, —SH, —OH,

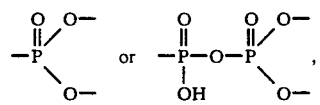

—CH=$CH_2$, or is non-existent, and $R^5$ is an alkylene group containing from about 1 to about 18 carbon atoms when Y is —$NH_2$, —SH, —OH,

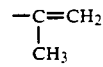

or —CH=$CH_2$, or when Y is non-existent, $R^5$ is an alkyl group containing from about 1 to about 18 carbon atoms. Preferably, the phosphorus functional peel strength-improving additive has an $R^4$ containing from about 3 to about 6 carbon atoms, X is

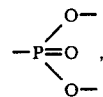

Y is non-existent, and $R^5$ is an alkyl group containing from about 3 to about 12 carbon atoms; most preferably the phosphorus functional peel strength-improving additive has an $R^4$ of either isopropyl or neoalkyl of 12 carbon atoms, Y is non-existent, and $R^5$ is octyl leading to the following structures:

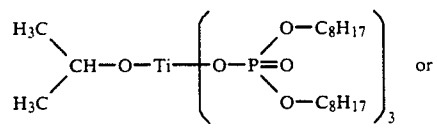 or

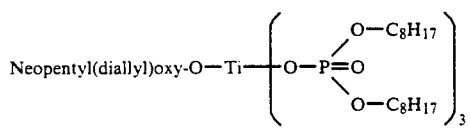

The peel strength-improving additives are utilized by addition to an $AR(OH)_n$ polar solvent solution. The peel strength additive preferably is utilized at from about 0.25 percent to about 2.0 percent and most preferably from about 0.25 percent to about 0.75 percent by weight. It is also within the scope of this invention to utilize equal parts of two peel strength-improving additives in an $AR(OH)_n$ polar solvent solution. It is especially advantageous to employ equal parts of a peel strength-improving additive of structure (I) and structure (II) set forth immediately above, wherein the structure (I) compound is

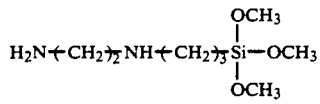

and the structure II compound is

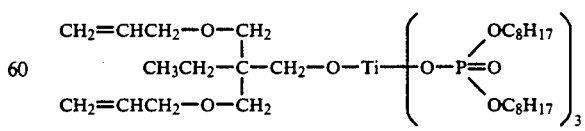

The polar solvents utilized are alcohols having from about 1 to about 5 carbon atoms, ketones having from about 3 to about 7 carbon atoms, tetrahydrofuron and water. Ethanol and methyl ethyl ketone are preferred solvents. The amount of $AR(OH)_n$ employed is from about 5 percent to about 60 percent by weight, preferably from about 10 percent to about 50 percent, and most preferably from about 20 percent to about 40 percent by weight based on the total weight of $AR(OH)_n$ and the solvent. After the $AR(OH)_n$ solvent solution is prepared, the peel strength-improving additive is introduced in the solvent to form a precoat solution.

Figure 13:
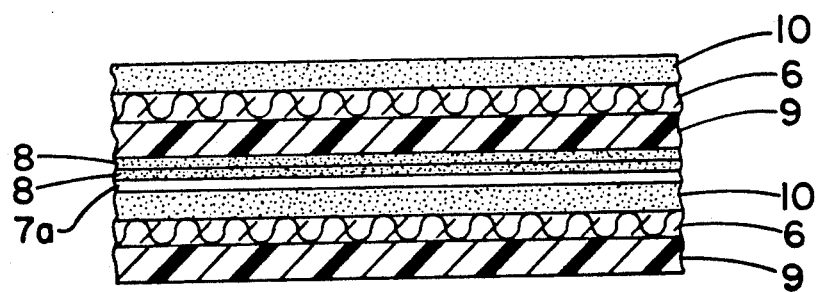
FIG. 13 is a cross-sectional view of the fabric of FIG. 12 folded upon itself, wherein the aluminum in urethane coating is precoated with a peel strength-improving additive and AR(OH)$_n$ composition and has a layer of adhesive subsequently applied thereon, and further wherein a layer of adhesive is applied to the non-precoated polyurethane and the two adhesive-coated urethane sides are bonded together.

In practicing the third embodiment of the invention, the double-coated nylon fabric 6 as shown in FIG. 12 is formed into a tubular shape such as for producing an aircraft escape chute or the like, so that polyurethane coating 9 is adhered to the urethane coating 10 containing aluminum flakes. This is accomplished by precoating a portion of coating 10 with an $AR(OH)_n$ in polar solvent solution that also contains a peel strength-improving additive indicated as 7a. The solvent is permitted to evaporate and an adhesive 8 is applied over the precoat and to a portion of polyurethane coating 9 which will be placed in contact with the treated portion of polyurethane coating 10 when the article of the end use application is produced. This configuration is shown in FIG. 13. After contacting coatings 9 and 10, an adhesive to adhesive bond occurs.

The preferred $AR(OH)_n$ compound is resorcinol and the preferred solvent is ethanol, wherein a 60 percent by weight resorcinol in ethanol solution is prepared. This is identified as the control in the following tables. Various precoat compositions are prepared utilizing 0.5 percent of a peel strength-improving additive, a 60 percent resorcinol in ethanol solvent based on the weight of the resorcinol ethanol solution, wherein the retained peel strength preferably is at least 80 percent. However, it is understood that the retained peel strength can be varied to meet specifications for a particular application without affecting the concept of the invention.

Table XIII contains data for a 60 percent resorcinol in ethanol solution as a control and also various peel strength-improving additives used at 0.5 percent weight in a 60 percent resorcinol in ethanol solution. The fabric has two coated sides: an aluminum in urethane side and a "yellow" or non-aluminum side which is a polyurethane coating. No wiping of the surfaces with methyl ethyl ketone prior to the precoat application occurred. The resorcinol-ethanol solution is applied to the aluminum in urethane side of the fabric as a precoat. After evaporation of the ethyl alcohol, an adhesive is applied over the precoat and also to the yellow side, and the adhesive-coated sides are bonded together. The aluminum in urethane side was not wiped with any solvent prior to application of the precoat. The adhesive is A1503B which is fully described in the disclosure of the first embodiment of the present invention. The fabric is NS-452B. The use of the various peel strength-improving additives in the resorcinol ethanol solution gave better peel strength results as measured at both two days and seven days over a control lacking the peel strength improving additive.

TABLE XIII

| SAMPLE | PEEL STRENGTH-IMPROVING ADDITIVE | PEEL STRENGTH DAY 2 | % IMPROVEMENT OVER CONTROL | PEEL STRENGTH DAY 7 | % IMPROVEMENT OVER CONTROL |
| --- | --- | --- | --- | --- | --- |
| 1. | None (Control) | 10.2 | — | 7.5 | — |
| 2. | 0.25% by wt. neopentyl(diallyl)oxy-O—Ti$+$O—P($+$OC$_8$H$_{17}$)$_2$]$_3$ (with O double bond on P) $+$ 0.25% by wt. H$_2$N$+$CH$_2+_2$NH$+$CH$_2+_3$Si$+$OCH$_3$)$_3$ | 12.6 | 23.5 | 9.8 | 31 |
| 3. | 0.5% by wt. H$_2$N$+$CH$_2+_3$NH$_2$ | 10.6 | 4 | 7.8 | 4 |
| 4. | 0.5% by wt. HS$+$CH$_2$CH$_2$S$+$H | 10.9 | 7 | 8.6 | 15 |
| 5. | 0.5% by wt. neopentyl(diallyl)-oxy-O—Ti$+$OC$_2$H$_4$NHC$_2$H$_4$NH$_2$)$_3$ | 10.7 | 5 | 8.0 | 7 |

The samples prepared in tables XIV and XV below are each similar to those prepared and observed in Table XIII except that the aluminum in urethane side of the fabric was wiped with methyl ethyl ketone. After evaporation, the precoat and adhesive was applied as per Table XIII. Use of the various peel strength-improving additives in the resorcinol ethanol solution gave better peel strength results as measured at both two days and seven days over a control without the peel strength-improving additive.

TABLE XIV

| SAMPLE | ADDITIVE | PEEL STRENGTH DAY 2 | % IMPROVEMENT OVER CONTROL | PEEL STRENGTH DAY 7 | % IMPROVEMENT OVER CONTROL |
| --- | --- | --- | --- | --- | --- |
| 1. | None (Control) | 10.7 | — | 11.0 | — |
| 2. | 0.25% by wt. neopentyl(diallyl)oxy-O—Ti—O$+$O—P($+$OC$_8$H$_{17}$)$_2$]$_3$ $+$ 0.25% by wt. H$_2$N$+$CH$_2+_2$NH$+$CH$_2+_3$Si$+$OCH$_3$)$_3$ | 12.5 | 17 | 13.4 | 21.8 |
| 3. | 0.5% by wt. H$_2$N$+$CH$_2+_3$NH$_2$ | 13.0 | 21.5 | 11.1 | 1 |

TABLE XIV-continued

| SAMPLE | ADDITIVE | PEEL STRENGTH DAY 2 | % IMPROVEMENT OVER CONTROL | PEEL STRENGTH DAY 7 | % IMPROVEMENT OVER CONTROL |
|---|---|---|---|---|---|
| 4. | 0.5% by wt. neoalkoxy, tri(N ethylamino ethylamine)titanate neopentyl(diallyl)oxy-O—Ti$\pm$OC$_2$H$_4$NHC$_2$H$_4$NH$_2$)$_3$ | 14.8 | 38 | 13.9 | 26 |

TABLE XV

| SAMPLE | ADDITIVE | PEEL STRENGTH DAY 2 | % IMPROVEMENT OVER CONTROL | PEEL STRENGTH DAY 7 | % IMPROVEMENT OVER CONTROL |
|---|---|---|---|---|---|
| 1. | None (Control) | 10.45 | | 9.3 | |
| 2. | 1.0% by wt. neopentyl(diallyl)oxy-O—Ti$\pm$O—P$\pm$O—C$_8$H$_{17}$)$_2$)$_3$ + 1.0% by wt. H$_2$N$\pm$CH$_2$$)_2$NH$\pm$CH$_2$$)_3$Si$\pm$OCH$_3$)$_3$ | 10.3 | −1.4 | 9.4 | 1.1 |
| 3. | 0.5% by wt. neopentyl(diallyl)oxy-O—Ti$\pm$O—P$\pm$O—C$_8$H$_{17}$)$_2$)$_3$ + 0.5% by wt. H$_2$N$\pm$CH$_2$$)_2$NH$\pm$CH$_2$$)_3$Si$\pm$OCH$_3$)$_3$ | 11.7 | 12.0 | 11.6 | 24.7 |
| 4. | 0.5% by wt. (CH$_3$—C(CH$_3$)—O$)_3$Ti.[HP$\pm$OC$_8$H$_{17}$)$_2$]$_2$ + 0.5% by wt. H$_2$N$\pm$CH$_2$$)_2$NH$\pm$CH$_2$$)_3$Si$\pm$OCH$_3$)$_3$ | 12.6 | 20.6 | 12.0 | 29.0 |
| 5. | 0.5% by wt. 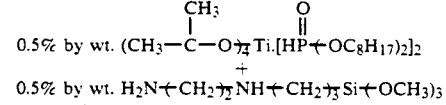 Ti$\pm$O—P$\pm$OC$_8$H$_{17}$)$_2$]$_2$ + 0.5% by wt. H$_2$N$\pm$CH$_2$$)_2$NH$\pm$CH$_2$$)_3$Si$\pm$OCH$_3$)$_3$ | 13.1 | 25.4 | 11.3 | 21.5 |
| 6. | 0.25% by wt. 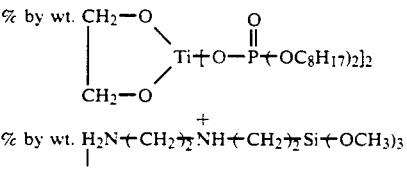 + 0.25% H$_2$N$\pm$CH$_2$$)_2$NH$\pm$CH$_2$$)_3$Si$\pm$OCH$_3$)$_3$ | 11.5 | 10.0 | 11.1 | 19.4 |
| 7. | 0.25% by wt. 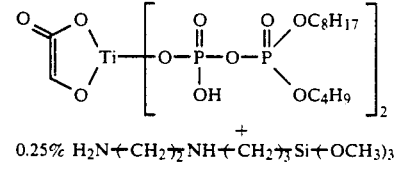 + 0.25% by wt. H$_2$N$\pm$CH$_2$$)_2$NH$\pm$CH$_2$$)_3$Si$\pm$OCH$_3$)$_3$ | 10.9 | 4.3 | 10.6 | 14.0 |
| 8. | 0.25% by wt. 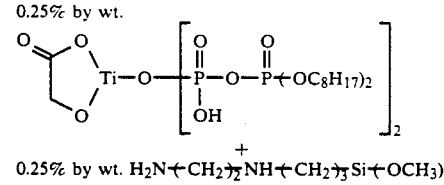 + 0.25% by wt. H$_2$N$\pm$CH$_2$$)_2$NH$\pm$CH$_2$$)_3$Si$\pm$OCH$_3$)$_3$ | 10.9 | 4.3 | 10.5 | 12.9 |
| 9. | 0.5% (C$_8$H$_{17}$O$)_3$Ti.[HP$\pm$O—C$_{13}$H$_{27}$)$_2$]$_2$ | 11.2 | 7.2 | 10.7 | 15.1 |

While in accordance with the Patent Statutes, the best modes and preferred embodiments have been set forth, the scope of the invention is not limited thereto, but rather by the scope of the attached claims.

What is claimed is:

1. A precoat composition comprising:

a compound AR(OH)$_n$, wherein AR is an aromatic moiety and n is an integer of from about 1 to about 3;

a peel strength-improving additive; and a polar solvent, so that upon application of said precoat composition to at least one of first and second polyurethane-coated surfaces of a nylon fabric to be brought into contact, and subsequent application of a formaldehyde-free polyurethane adhesive to said surfaces, adhesion between said coated nylon surfaces is improved.

2. The precoat composition of claim 1, wherein AR is a benzene nucleus or a naphthalene nucleus; wherein said AR(OH)$_n$ is utilized in an amount of from about 5 percent to about 60 percent by weight based on the total weight of said AR(OH)$_n$ and said polar solvent; wherein said peel strength-improving additive is utilized in an amount of from about 0.25 percent to about 2 percent by weight based on the total weight of said AR(OH)$_n$ and said polar solvent; wherein said peel strength-improving additive comprises a titanium or zirconium base having at least one functional group of —OH, —SH, —NH$_2$, or phosphorous, or combinations thereof, or a pair of said peel strength-improving additives, wherein one of said pair comprises a titanium or zirconium base having at least one of said functional groups or combinations thereof, and the other of said pair comprises a silicone base having at least one of said functional groups or combinations thereof; wherein said polar solvent is utilized in an amount of from about 40 percent to about 95 percent by weight based on the total weight of said AR(OH)$_n$ and said polar solvent; and wherein said polar solvent is an alcohol having 1 to 5 carbon atoms, a ketone having 3 to 7 carbon atoms, tetrahydrofuran, or water.

3. The precoat composition of claim 2, wherein said AR(OH)$_n$ is resorcinol and is utilized in an amount of from about 10 percent to about 50 percent by weight based on the total weight of resorcinol and said polar solvent; wherein said peel strength-improving additive is utilized in an amount of from about 0.25 percent to about 0.75 percent by weight based on the total weight of resorcinol and said polar solvent; wherein equal parts of each of said peel strength-improving additives are utilized when a pair of said peel strength-improving additives is used; wherein said polar solvent is utilized in an amount of from about 50 percent to about 90 percent based on the total weight of resorcinol and said polar solvent; and wherein said polar solvent is methyl ethyl ketone or ethanol.

4. The precoat composition of claim 3, wherein resorcinol is utilized in an amount of from about 20 percent to about 40 percent based on the total weight of resorcinol and said polar solvent; wherein said polar solvent is ethanol and is utilized in an amount of from about 60 percent to about 80 percent based on the total weight of resorcinol and ethanol; wherein said first surface of said polyurethane-coated nylon fabric is an aluminum-filled polyurethane coating and said second surface is a polyurethane coating; wherein said aluminum-filled polyurethane coating is precoated with said precoat composition; and wherein the adhesion between said polyurethane-coated nylon surfaces as measured by retained peel strength is at least about 80 percent.

5. An adhesive admixture composition, comprising:

a compound AR(OH)$_n$, wherein AR is an aromatic moiety and n is an integer of from about 1 to about 3;

a peel strength-improving additive; and a formaldehyde-free polyurethane adhesive, wherein said admixture improves adhesion between first and second polyurethane-coated nylon fabric surfaces when said surfaces are brought into contact.

6. The admixture composition of claim 5, wherein AR is a benzene nucleus or a naphthalene nucleus; wherein said AR(OH)$_n$ is utilized in an amount of from about 5 percent to about 60 percent by weight based on the total weight of said AR(OH)$_n$ and said polar solvent; wherein said peel strength-improving additive is utilized in an amount of from about 0.25 percent to about 2 percent by weight based on the total weight of said AR(OH)$_n$ and said polar solvent; wherein said peel strength-improving additive comprises a titanium or zirconium base having at least one functional group of —OH, —SH, —NH$_2$, or phosphorous, or combinations thereof, or a pair of said peel strength-improving additives, wherein one of said pair comprises a titanium or zirconium base having at least one of said functional groups or combinations thereof, and the other of said pair comprises a silicone base having at least one of said functional groups or combinations thereof; wherein said polar solvent is utilized in an amount of from about 40 percent to about 95 percent by weight based on the total weight of said AR(OH)$_n$ and said polar solvent; wherein said polar solvent is an alcohol having 1 to 5 carbon atoms, a ketone having 3 to 7 carbon atoms, tetrahydrofuran, or water; and wherein said polyurethane adhesive is formed from a polyester intermediate, a polyether intermediate or a polycarbonate intermediate.

7. The admixture composition of claim 6, wherein said AR(OH)$_n$ is resorcinol and is utilized in an amount of from about 10 percent to about 50 percent by weight based on the total weight of resorcinol and said polar solvent; wherein said peel strength-improving additive is utilized in an amount of from about 0.25 percent to about 0.75 percent by weight based on the total weight of resorcinol and said polar solvent; wherein equal parts of each of said peel strength-improving additives are utilized when a pair of said peel strength-improving additives is used; wherein said polar solvent is utilized in an amount of from about 50 percent to about 90 percent based on the total weight of resorcinol and said polar solvent; wherein said polar solvent is methyl ethyl ketone or ethanol; and wherein said intermediate is a polyester intermediate having a number average molecular weight of from about 500 to about 10,000, which is formed by the reaction of a dicarboxylic acid containing 2 to 10 carbon atoms and a glycol containing 2 to 10 carbon atoms.

8. The admixture composition of claim 7, wherein resorcinol is utilized in an amount of from about 20 percent to about 40 percent based on the total weight of resorcinol and said polar solvent; wherein said polar solvent is ethanol and is utilized in an amount of from about 60 percent to about 80 percent based on the total weight of resorcinol and ethanol; wherein said first surface of said polyurethane-coated nylon fabric is an aluminum-filled polyurethane coating and said second surface is a polyurethane coating; wherein the adhesion between said polyurethane coated nylon surfaces as measured by retained peel strength is at least about 80 percent; and wherein said polyester intermediate has a number average molecular weight of from about 600 to about 1500 and is formed by the reaction of adipic acid with an excess of from about 1.05 to about 1.50 equivalents of butane diol.

9. The adhesive admixture of claim 8, wherein said polyurethane adhesive is formed by reacting a blend of said polyester intermediate and a glycol chain extender having 2 to 10 carbon atoms, with a polyisocyanate compound.

10. The adhesive admixture of claim 9, wherein said glycol chain extender is butane diol and said polyisocyanate is an aromatic diisocyanate.

11. The adhesive admixture of claim 10, wherein said aromatic diisocyanate is p, p'-diisocyanate diphenyl methane (MDI); wherein from about 0.1 to about 2.1 moles of butane diol and from about 0.95 to about 1.12 moles of MDI is reacted with about 1 mole of said polyester intermediate; and wherein a polyisocyanate accelerator compound is utilized in association with said polyurethane adhesive.

12. The adhesive admixture of claim 11, wherein from about 0.98 to about 1.06 moles of MDI is utilized; and wherein said polyisocyanate accelerator compound is PAPI 2027.

13. An adhesive admixture composition, comprising:
a compound AR(OH)$_n$, wherein AR is an aromatic moiety and n is an integer of from about 1 to about 3; and
a formaldehyde-free polyurethane adhesive, wherein said admixture improves adhesion between two polyurethane-coated nylon fabrics, or an aluminum-filled polyurethane-coated nylon fabric and a polyurethane-coated nylon fabric.

14. The composition of claim 13, wherein said polyurethane adhesive comprises a polyester intermediate, or a polyether intermediate or a polycarbonate intermediate.

15. The composition of claim 14, wherein said polyurethane adhesive is formed by the reaction of a polyisocyanate with a blend of a polyester intermediate and a chain extender in a mole ratio of from about 0.95 to about 1.12, said polyester intermediate being formed by the reaction of a dicarboxylic acid or anhydride having from about 2 to about 10 carbon atoms with a glycol having from about 2 to about 10 carbon atoms in a mole ratio of from about 1:1.05-1.5, said chain extender being a glycol having from about 2 to about 10 carbon atoms; and wherein a polyisocyanate accelerator compound is utilized in association with said polyurethane adhesive.

16. The composition of claim 15, wherein the polyisocyanate is p,p'-diisocyanato diphenyl methane or a toluene diisocyanate; and wherein said polyisocyanate accelerator compound is PAPI 2027.

17. The composition of claim 14, wherein the polyether intermediate is formed by the reaction of a polyisocyanate with a blend of tetrahydrofuran and a chain extender at an NCO:OH ratio of from about 1.8:2.2; and wherein said polyisocyanate accelerator compound is PAPI 2027.

18. The composition of claim 16, wherein the nylon fabric is nylon 6/6, nylon 6/10, or nylon 10, nylon 11, nylon 6, nylon 6/12, nylon 6/9, nylon 12, nylon 4/6 and nylon 12/12.

19. The composition of claim 18, wherein the aromatic moiety is a benzene or naphthalene nucleus, n is 1 or 2, and the polar solvent is an alcohol having from 1 to 5 carbon atoms, ketones having from 3 to 7 carbon atoms, tetrahydrofuran, water or mixtures thereof.

20. The composition of claim 19, wherein the aromatic moiety is a benzene nucleus and n is 2.

21. The composition of claim 20, wherein the compound is resorcinol.

22. The composition of claim 21, wherein said polyurethane adhesive is formed by the reaction of diphenylmethane-4,4'-diisocyanate with a blend of a polyester intermediate and a chain extender in a mole ratio of from about 0.95 to about 1.12, said polyester intermediate being formed by the reaction of adipic acid with butane diol in a mole ratio of from about 1:1.05-1.5, and said chain extender being butane diol.

23. The composition of claim 13, having a retained wet peel strength of at least 90 percent.

24. The composition of claim 15, having a retained wet peel strength of at least 90 percent.

25. The composition of claim 22 wherein resorcinol is applied in a polar solvent to both polyurethane coated nylon fabrics by dusting, spraying, or brushing followed by application of said polyurethane adhesive and wherein said composition has a retained wet peel strength of at least 90 percent.

26. The composition of claim 22 wherein resorcinol is added to the polyurethane adhesive to form an adhesive admixture and said admixture is applied to both polyurethane coated nylon fabrics wherein said composition has a retained wet peel strength of at least about 90 percent.

27. An adhesive admixture composition, comprising:
a compound AR(OH)$_n$ in a polar solvent to precoat polyurethane-coated nylon fabrics or an aluminum filled polyurethane-coated nylon fabric, wherein AR is an aromatic moiety; and
a formaldehyde-free polyurethane adhesive, wherein said admixture improves adhesion between two polyurethane-coated nylon fabrics, or an aluminum filled polyurethane-coated nylon fabric and a polyurethane-coated nylon fabric.

28. The composition of claim 27, wherein said polyurethane adhesive is formed by the reaction of diphenylmethane-4,4'-diisocyanate with a blend of a polyester intermediate and a chain extender in a mole ratio of from about 0.95 to about 1.12, wherein said polyester intermediate is formed by the reaction of adipic acid with butane diol in a mole ratio of from about 1:1.05-1.5, and said chain extender is butane diol.

29. The composition of claim 28, wherein the nylon fabric is nylon 6/6, nylon 6/10, nylon 10, nylon 11, nylon 6, nylon 6/12, nylon 6/9, nylon 12, nylon 4/6 or nylon 12/12.

30. The composition of claim 29, wherein the aromatic moiety is a benzene nucleus, and the polar solvent is an alcohol having from 1 to 5 carbon atoms, ketones having from 3 to 7 carbon atoms, tetrahydrofuran, water or mixtures thereof.

31. The composition of claim 30, wherein the compound is resorcinol.

32. The composition of claim 31, wherein the polar solvent is ethanol or methyl ethyl ketone.

33. The composition of claim 32, wherein resorcinol:ethanol or methyl ethyl ketone is from 20:80 to 40:60 by weight; and wherein a polyisocyanate accelerator compound is utilized in association with said polyurethane adhesive.

34. The composition of claim 33, wherein said adhesive bonded composite has a retained wet peel strength of at least 90 percent; and wherein said polyisocyanate accelerator compound is PAPI 2027.

35. A precoat composition comprising:
a compound AR(OH)$_n$, wherein AR is an aromatic moiety and n is an integer of from about 1 to about 3; and a polar solvent, so that upon application of said precoat composition to at least one of first and second polyurethane-coated surfaces of a nylon fabric to be brought into contact, or to at least one of the surfaces of an aluminum-filled polyurethane-coated nylon fabric and a polyurethane-coated nylon fabric to be brought into contact, and subsequent application of formaldehyde-free polyurethane adhesive to said surfaces, adhesion between said coated nylon surfaces is improved.

36. A lamina composition, comprising:
a) at least two layers wherein at least one layer of nylon fabric is bonded by a formaldehyde-free adhesive layer to at least one layer of a polyurethane film, or
b) one lamina of (a) is bonded to another lamina of (a) through surfaces of the polyurethane films, or
c) one lamina of (a) is bonded to another lamina of (a) through surfaces of the nylon fabrics,
wherein one side of one layer has applied thereon an AR(OH)$_n$ precoat, wherein AR is a benzene or naphthalene nucleus and n is an integer of from 1 to about 3, wherein said adhesive layer is a polyurethane adhesive, and
wherein said lamina composition has a peel strength improvement of at least about 10 percent.

37. The composition of claim 36, wherein said polyurethane adhesive comprises a polyester intermediate, a polyether intermediate or a polycarbonate intermediate.

38. The composition of claim 37, wherein said polyurethane adhesive is formed by the reaction of a polyisocyanate with a blend of a polyester intermediate and a chain extender in a mole ratio of from about 0.95 to about 1.12, said polyester intermediate being formed by the reaction of a dicarboxylic acid or anhydride having from about 2 to about 10 carbon atoms with a glycol having from about 2 to about 10 carbon atoms in a mole ratio of from about 1:1.05–1.5, said chain extender being a glycol having from about 2 to about 10 carbon atoms; and wherein a polyisocyanate accelerator compound is utilized in association with said polyurethane adhesive.

39. The composition of claim 38, wherein the polyisocyanate is p,p'-diisocyanato diphenyl methane or a toluene diisocyanate; and wherein said polyisocyanate accelerator compound is PAPI 2027.

40. The composition of claim 39, wherein the nylon substrate is nylon 6, 6/6 or 6/10, the aromatic moiety is a benzene or naphthalene nucleus, and n is 1 or 2.

41. The composition of claim 40, wherein the aromatic moiety is a benzene nucleus and n is 2.

42. The composition of claim 41, wherein AR(OH)$_n$ is resorcinol.

43. The composition of claim 42, wherein said polyurethane adhesive is formed by the reaction of diphenylmethane-4,4'-diisocyanate with a blend of a polyester intermediate and a chain extender in a mole ratio of from about 0.95 to about 1.12, said polyester intermediate being formed by the reaction of adipic acid with butane diol in a mole ratio of from about 1:1.05–1.5, and said chain extender being butane diol.

44. The composition of claim 43, wherein the peel strength improvement is at least about 15 percent.

45. A lamina composition, comprising:
a) at least two layers wherein at least one layer of nylon fabric is bonded by a formaldehyde-free adhesive layer to at least one layer of a polyurethane film, or
b) one lamina of (a) is bonded to another lamina of (a) through surfaces of the polyurethane films, or
c) one lamina of (a) is bonded to another lamina of (a) through surfaces of the nylon fabrics,
wherein one side of one layer has applied thereon an AR(OH)$_n$ precoat, wherein AR is a benzene or naphthalene nucleus and n is an integer of from 1 to about 3, wherein said adhesive layer is a polyurethane adhesive containing from about 5 percent to about 25 percent by weight AR(OH)$_n$,
wherein said lamina composition has a peel strength improvement of at least about 10 percent.

46. The composition of claim 45, wherein said polyurethane adhesive comprises a polyester intermediate, a polyether intermediate or a polycarbonate intermediate.

47. The composition of claim 46, wherein said polyurethane adhesive is formed by the reaction of a polyisocyanate with a blend of a polyester intermediate and a chain extender in a mole ratio of from about 0.95 to about 1.12, said polyester intermediate being formed by the reaction of a dicarboxylic acid or anhydride having from about 2 to about 10 carbon atoms with a glycol having from about 2 to about 10 carbon atoms in a mole ratio of from about 1:1.05–1.5, said chain extender being a glycol having from about 2 to about 10 carbon atoms.

48. The composition of claim 47, wherein the polyisocyanate is p,p'-diisocyanato diphenyl methane or a toluene diisocyanate; and wherein a polyisocyanate accelerator compound is utilized in association with said polyurethane adhesive.

49. The composition of claim 48, wherein the nylon substrate is nylon 6, 6/6 or 6/10 and the aromatic moiety is a benzene or naphthalene nucleus and n is 1 or 2; and wherein said polyisocyanate accelerator compound is PAPI 2027.

50. The composition of claim 49, wherein the aromatic moiety is a benzene nucleus and n is 2.

51. The composition of claim 50, wherein the compound is resorcinol.

52. The composition of claim 51, wherein said polyurethane adhesive is formed by the reaction of diphenylmethane-4,4'-diisocyanate with a blend of a polyester intermediate and a chain extender in a mole ratio of from about 0.95 to about 1.12, said polyester intermediate being formed by the reaction of adipic acid with butane diol in a mole ratio of from about 1:1.05–1.5, and said chain extender being butane diol.

53. The composition of claim 52, wherein the peel strength improvement is at least about 20 percent.

54. The composition of claim 53, wherein the formaldehyde-free adhesive contains from about 9 to about 18 percent resorcinol by weight.

55. A lamina composition comprising:
a) at least two layers wherein at least one layer of nylon fabric is bonded by a formaldehyde-free adhesive layer to at least one layer of a polyurethane film, or
b) one lamina of (a) is bonded to another lamina of (a) through surfaces of the polyurethane films, or
c) one lamina of (a) is bonded to another lamina of (a) through surfaces of the nylon fabrics,
wherein one side of one layer has applied thereon an AR(OH)$_n$ precoat wherein AR is an aromatic moiety and n is an integer of from about 1 to about 3, wherein said adhesive layer is a formaldehyde-free polyurethane adhesive containing AR(OH)$_n$, and wherein said lamina composition has a peel strength improvement of at least about 10 percent.

* * * * *